(12) United States Patent
Jain et al.

(10) Patent No.: US 7,715,353 B2
(45) Date of Patent: May 11, 2010

(54) WIRELESS LAN CELL BREATHING

(75) Inventors: Kamal Jain, Bellevue, WA (US);
Paramvir Bahl, Sammamish, WA (US);
Lili Qiu, Austin, TX (US); Vahab Mirrokni, Seattle, WA (US);
Mohammadtaghi Hajiaghayi, Cambridge, MA (US); Amin Saberi, Palo Alto, CA (US)

(73) Assignee: Microsoft Corporation, Redmond, WA (US)

( * ) Notice: Subject to any disclaimer, the term of this patent is extended or adjusted under 35 U.S.C. 154(b) by 998 days.

(21) Appl. No.: 11/409,132

(22) Filed: Apr. 21, 2006

(65) Prior Publication Data

US 2007/0248059 A1    Oct. 25, 2007

(51) Int. Cl.
*H04Q 7/24* (2006.01)
(52) U.S. Cl. .................. 370/338; 370/235; 370/351; 455/522; 455/67.11; 455/226.1
(58) Field of Classification Search ............. 370/338, 370/235, 351; 455/450, 452.1, 522, 67.11, 455/226.1
See application file for complete search history.

(56) References Cited

U.S. PATENT DOCUMENTS 6,907,229 B2 *   6/2005   Shpak ................... 455/69

OTHER PUBLICATIONS

P. Bahl, et al., Satisfying the need for ubiquitous secure connectivity and location services. 9(1), Feb. 2002.
P. Bahl, et al., Cell breathing in a wireless lans: Algorithms and evaluation. Microsoft Technical Report, 2005.
A. Balachandran, et al., Hot-spot congestion relief in public-area wireless networks. In SIGCOMM Comput. Commun. Review, 2002.
A. Balachandran, et al., Characterizing user behavior and network performance in a public wireless lan. In Proc. of ACM Sigmetrics, Jun. 2002.
M. Balazinska, et al., Characterizing mobility and network usage in a corporate wireless local-area network. In Proc. of ACM MOBISYS, May 2003.
Y. Bejerano, et al., Fairness and load balancing in wireless lans using association control. In Proc. of ACM Mobicom, 2004.
C. Chekuri, et al., A ptas for the mulitiple knapsack problem. In SODA, pp. 213-222, 2000.
Cisco aironet 350 series. Downloaded from http://www.cisco.com/warp/public/cc/pd/witc/ao350ap/.

(Continued)

*Primary Examiner*—Temica M Beamer
(74) *Attorney, Agent, or Firm*—Lee & Hayes, PLLC

(57) ABSTRACT

Utilization of wireless access points (APs) is optimized by dynamically managing transmitted AP power levels of beacon packets to control wireless AP coverage. This permits traffic congestion at one wireless AP to be reduced and shifted to other wireless APs. AP coverage management is provided by a centralized mechanism that employs various interpretations and/or measurements of client received power to handle dynamic changes in client workloads. The control does not require protocol changes to clients that utilize a wireless AP and can also incorporate hand-off costs and/or manufacturer specified power level constraints. Thus, these techniques can be employed in existing wireless LANs without impacting clients. Various instances are employable with continuous power and/or discrete power based wireless APs, providing a non-client impacted means to increase throughput and/or load balance.

11 Claims, 10 Drawing Sheets

OTHER PUBLICATIONS

Dartmouth campus-wide wireless traces. Downloaded from http://www.cs.dartmouth.edu/campus/.

N. Devanur, et al., Market equilibrium via a primal-dual-type algorithm. In FOCS, 2002.

L. Du, et al, A bubble oscillation algorithm for distributed geographic load balancing in mobile networks, Mar. 2004.

J. Edmonds, Paths, trees, and flowers. Canad. J. Math., 17:449-467, 1965.

Y. Fukuda, et al., Decentralized access point selection architecture for wireless lans—deployability and robustness for wireless lans. In Proc. of IEEE VTC, Sep. 2004.

R. Garg, et al., Auction algorithms for market equilibrium. In STOC, pp. 511-518, 2004.

H. Hindi, A tutorial on convex optimization. In Proceedings of American Control Conference, 2004.

K. Jain, A polynomial-time algorithm for computing an arrow-debreu market equilibrium for linear utilities. In FOCS, 2004.

G. Judd, et al., Fixing 802.11 access point selection. In ACM SIGCOMM Poster, Aug. 2002.

V. Kawadia, et al., Power control and clustering in ad hoc networks. In Proc. of IEEE INFOCOMM, Apr. 2003.

F. Kelly, Mathematical modelling of the internet. Mathamatics Unlimited—2001 and Beyond, Springer-Verlag, pp. 685-702, 2001.

D. Kotz, et al., Analysis of a campus-wide wireless network. In Proc. of ACM MOBICOM '2002, Sep. 2002.

S. Low, et al., Optimization flow control, i: Basic algorithm and convergence. IEEE/ACM Transactions on Networking, vol. 7, pp. 861-875, 1999.

S. Low, et al., Understanding vegas: A duality model. Journal of ACM, 49(2), pp. 207-235, 2002.

Prosafe 802.11g wireless access point—model wg302. Downloaded from http://www.netgear.com/products/details/WG302.php.

T. S. E. Ng, et al., Predicting Internet network distance with coordinates-based approaches. In Proc. of IEEE Infocom, Jun. 2002.

I. Papanikos, et al., A study on dynamic load balance for ieee 802.11b wireless lan. In Proc. COMCON, 2001.

J. Qiu, et al., A dynamic load sharing algorithm through power control in cellular cdma, Sep. 1998.

R. Ramanathan, et al., Topology control of multihop wireless networks using transmit power adjustment. In Proc. of IEEE Infocom, Apr. 2000.

D. Sshwab, et al., Characterizing the use of a campus wireless network. In Proc. of IEEE Infocom, Mar. 2004.

S. Singh, et al., Power aware routing in mobile ad hoc networks. In Proc. of ACM MOBICOM, Sep. 1998.

D. Tang, et al., Analysis of a local-area wireless network. In Proc. of ACM Mobicom, Aug. 2000.

D. Tang, et al., Analysis of a local-area wireless network. In ACM MobiCom, pp. 1-10, Aug. 2001.

Wireless lan traces from acm sigcomm'01. Downloaded from http://ramp.ucsd.edu/pawn/sigcomm-trace/.

R. Wattenhofer, et al, Distributed topology control for power efficient operation in multihop wireless ad hoc networks. In Proc. of IEEE INFOCOM, 2001.

Wireless security auditor (WSA) Downloaded from http://www.research.ibm.com/gsal/wsa/.

D. P. Bertsekas, Linear network optimization: Algorithms and codes, M.I.T. Press, Cambridge, MA, 1991.

A. Schrijver, Theory of linear and integer programming, John Wiley & Sons, New York, 1986.

Cisco aironet 350 series. Downloaded from http://www.cisco.com/warp/public/cc/pd/witc/ao350ap/index, 1992-2007.

Dartmouth College campus-wide wireless wireless network: research. Downloaded from http://www.cs.dartmouth.edu/campus/, Jan. 12, 2005.

Prosafe 802.11g wireless accesspoint—model wg302. Downloaded from http:www.netgear.com/products/details/WG302.php, 1996-2006.

Wireless security auditor (WSA) Downloaded from http://www.research.ibm.com/gsal/wsa, Downloaded on May 17, 2006.

Wiresless lan traces from acm sigcomm '01. Downloaded from http://ramp.ucsd.edu/pawn/sigcomm-trace/, Aug. 2001.

\* cited by examiner

WIRELESS LAN CELL BREATHING

BACKGROUND

Although most of the benefits are apparent for wireless networks and devices, many problems arise when actually implementing them. One substantial issue lies with the ever increasing number of wireless networks users. The mobility enhancements gained with wireless networks have become increasingly attractive for more and more users who demand that they have more access locations or wireless "hot spots." A particular hot spot can become overwhelmed when users are physically limited to a particular area such as within an airport. This causes increased congestion at a particular wireless hot spot and may drastically reduce the performance of the wireless network at that point or "node" while other network wireless access points may be substantially under utilized. This causes unbalanced loading of the network and can severely impact the quality of the wireless connection for wireless users.

SUMMARY

The following presents a simplified summary of the subject matter in order to provide a basic understanding of some aspects of subject matter embodiments. This summary is not an extensive overview of the subject matter. It is not intended to identify key/critical elements of the embodiments or to delineate the scope of the subject matter. Its sole purpose is to present some concepts of the subject matter in a simplified form as a prelude to the more detailed description that is presented later.

The subject matter relates generally to wireless networks, and more particularly to enhancing utilization of wireless access points (APs). Dynamic power level management of AP beacon packets is leveraged to control wireless access point coverage, providing optimum throughput and/or utilization of wireless LANs. This allows traffic congestion at one wireless access point to be reduced and shifted to other wireless access points. Control is provided by a centralized mechanism that employs various interpretations and/or measurements of client received power to handle dynamic changes in client workloads. The control does not require protocol changes to clients that utilize a wireless access point and can also incorporate hand-off costs and/or manufacturer specified power level constraints. Thus, these techniques can be employed in existing wireless LANs without impacting clients. Various instances are employable with continuous power and/or discrete power based wireless access points, providing a non-client impacted means to increase throughput and/or optimize power.

To the accomplishment of the foregoing and related ends, certain illustrative aspects of embodiments are described herein in connection with the following description and the annexed drawings. These aspects are indicative, however, of but a few of the various ways in which the principles of the subject matter may be employed, and the subject matter is intended to include all such aspects and their equivalents. Other advantages and novel features of the subject matter may become apparent from the following detailed description when considered in conjunction with the drawings.

DETAILED DESCRIPTION

Figure 1:
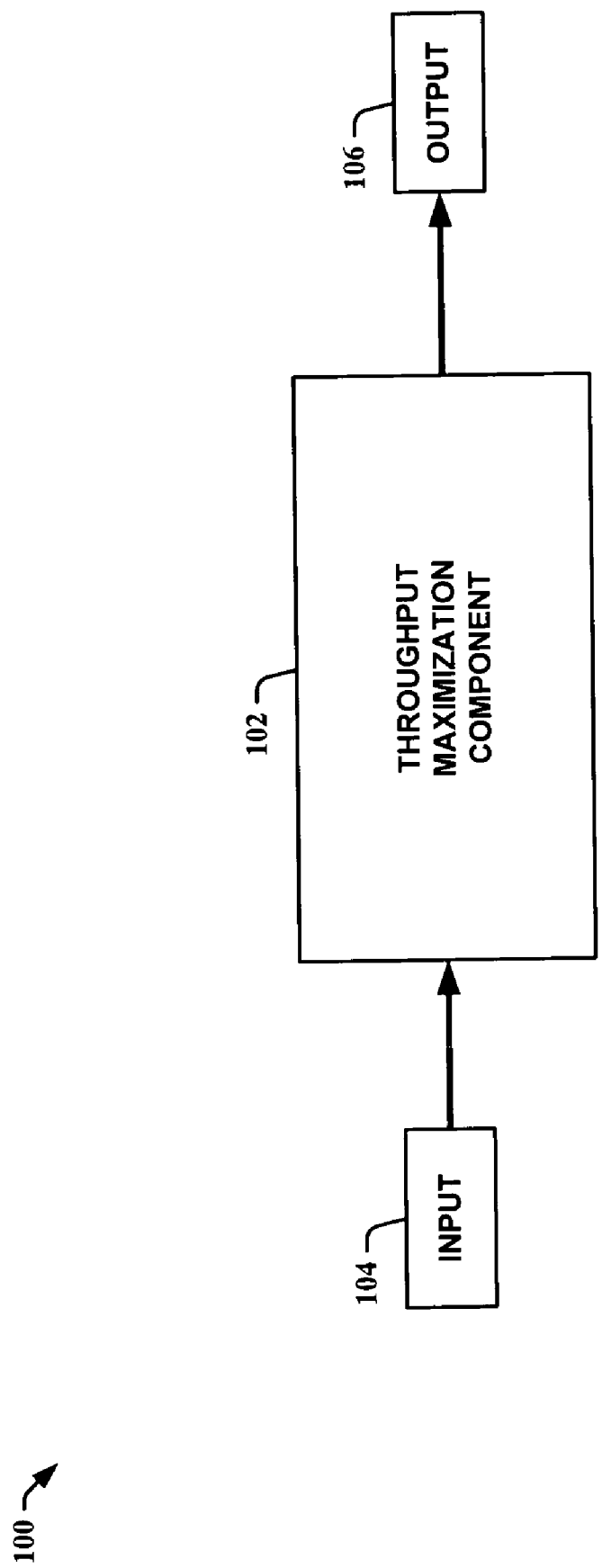
FIG. 1 is a block diagram of a wireless LAN data throughput maximization system in accordance with an aspect of an embodiment.

The subject matter is now described with reference to the drawings, wherein like reference numerals are used to refer to like elements throughout. In the following description, for purposes of explanation, numerous specific details are set forth in order to provide a thorough understanding of the subject matter. It may be evident, however, that subject matter embodiments may be practiced without these specific details. In other instances, well-known structures and devices are shown in block diagram form in order to facilitate describing the embodiments.

As used in this application, the term "component" is intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a computer component. One or more components may reside within a process and/or thread of execution and a component may be localized on one computer and/or distributed between two or more computers.

Wireless devices are often mobile and need to be connected to base stations which provide access points (APs) to a wireless Local Area Network (LAN). These APs have a certain capacity, e.g., an AP can serve so many wireless devices. Many times a wireless device can access more than one AP. Thus, when given more than one possibility, the client itself can impact the overall performance of the wireless LAN by loading a particular AP over another. Without proper access management, the clients can overload that particular AP while other nearby APs remain under utilized. Trivial solutions, like randomly picking one of the reachable APs, do not optimize AP utilization. For example, considering the coupon collector problem, one of the APs can be overloaded by a factor of Log N, where N is the number of wireless devices. Instances disclosed herein provide a means to manage AP coverage in a centralized and/or distributed fashion to facilitate in optimizing their performance.

The techniques disclosed herein are especially useful for wireless LAN administrators who often have to deal with the problem of sporadic client congestion in popular locations within the network. Instances herein utilize Cell Breathing as a load balancing and/or data throughput maximization mechanism to handle client congestion in a wireless LAN. Power management algorithms are employed for controlling the coverage of access points to handle dynamic changes in client workloads. Hand-off costs and manufacturer specified power level constraints are also incorporated into the algorithms. This approach does not require modification to clients or to protocol standards. Cell breathing significantly outperforms the commonly used fixed power scheme, and performs on par with sophisticated load balancing schemes that require changes to both the client and access points.

In FIG. 1, a block diagram of a wireless LAN data throughput maximization system 100 in accordance with an aspect of an embodiment is shown. The wireless LAN data throughput maximization system 100 is comprised of a throughput maximization component 102 that obtains an input 104 and provides an output 106. The input 104 generally includes client received power information that can be obtained through reporting, measuring, and/or estimation techniques and the like. In one instance, a power transmitted to power received ratio is utilized. The throughput maximization component 102 is employed to dynamically control client access to an AP without client modification. This is accomplished by utilizing AP beacon power control techniques described in detail infra. The throughput maximization component 102 determines appropriate power levels and provides power level control as an output 106. The output 106 can be utilized to control any number of APs that provide access to a wireless LAN.

The throughput maximization component 102 can be employed with continuous (with homogeneous or heterogeneous client demands) and/or discrete power APs. Instances can also account for dynamic client demands and/or optimize power for APs. The wireless LAN data throughput maximization system 100 can be employed without requiring changes to be made to clients that access a wireless LAN, easing installation of the system 100 and eliminating costs and/or burdens on the clients to enable interaction with the system 100. The techniques utilized by the wireless LAN data throughput maximization system 100 also provide worst case guarantees unlike heuristic based techniques utilized in the cellular industry. In sharp contrast to traditional techniques, the wireless LAN data throughput maximization system 100 maximizes total network data throughput rather than just balancing client loads for a wireless LAN.

Figure 2:
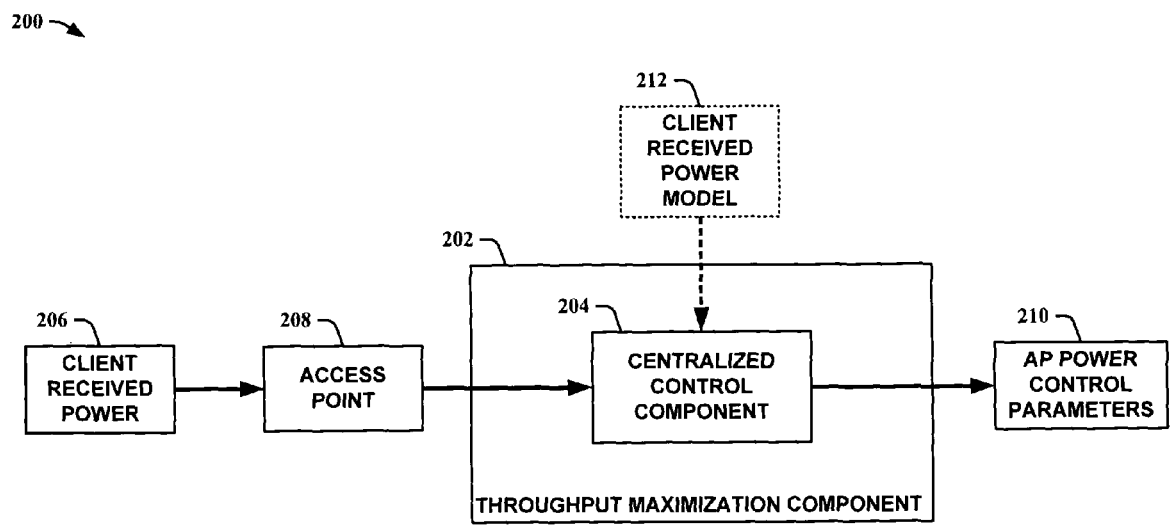
FIG. 2 is another block diagram of a wireless LAN data throughput maximization system in accordance with an aspect of an embodiment.

Looking at FIG. 2, another block diagram of a wireless LAN data throughput maximization system 200 in accordance with an aspect of an embodiment is illustrated. The wireless LAN data throughput maximization system 200 is comprised of a throughput maximization component 202. The throughput maximization component 202 is comprised of a centralized control component 204 that obtains client received power 206 via an access point (AP) 208 and provides AP power control parameters 210. Optionally, the centralized control component 204 can utilize a client received power model 212 to provide information regarding client received power without requiring the information from the AP 208.

The optional client received power model 212 can provide a complex estimation and/or a simpler solution such as a ratio indicating how client received power is proportional to AP transmitted power and the like. One skilled in the art can appreciate that other instances of the throughput maximization component 202 can employ distributed control components as well that can reside in other parts of a wireless LAN such as, for example, within an access point and the like, to further facilitate control of the AP power. The AP power control parameters 210 can include, but are not limited to, AP power levels, power ON/OFF commands, and/or power level increase/decrease information (e.g., percentage reduction of power over time, e.g., 10% each minute for 10 minutes, etc.) and the like.

Figure 3:
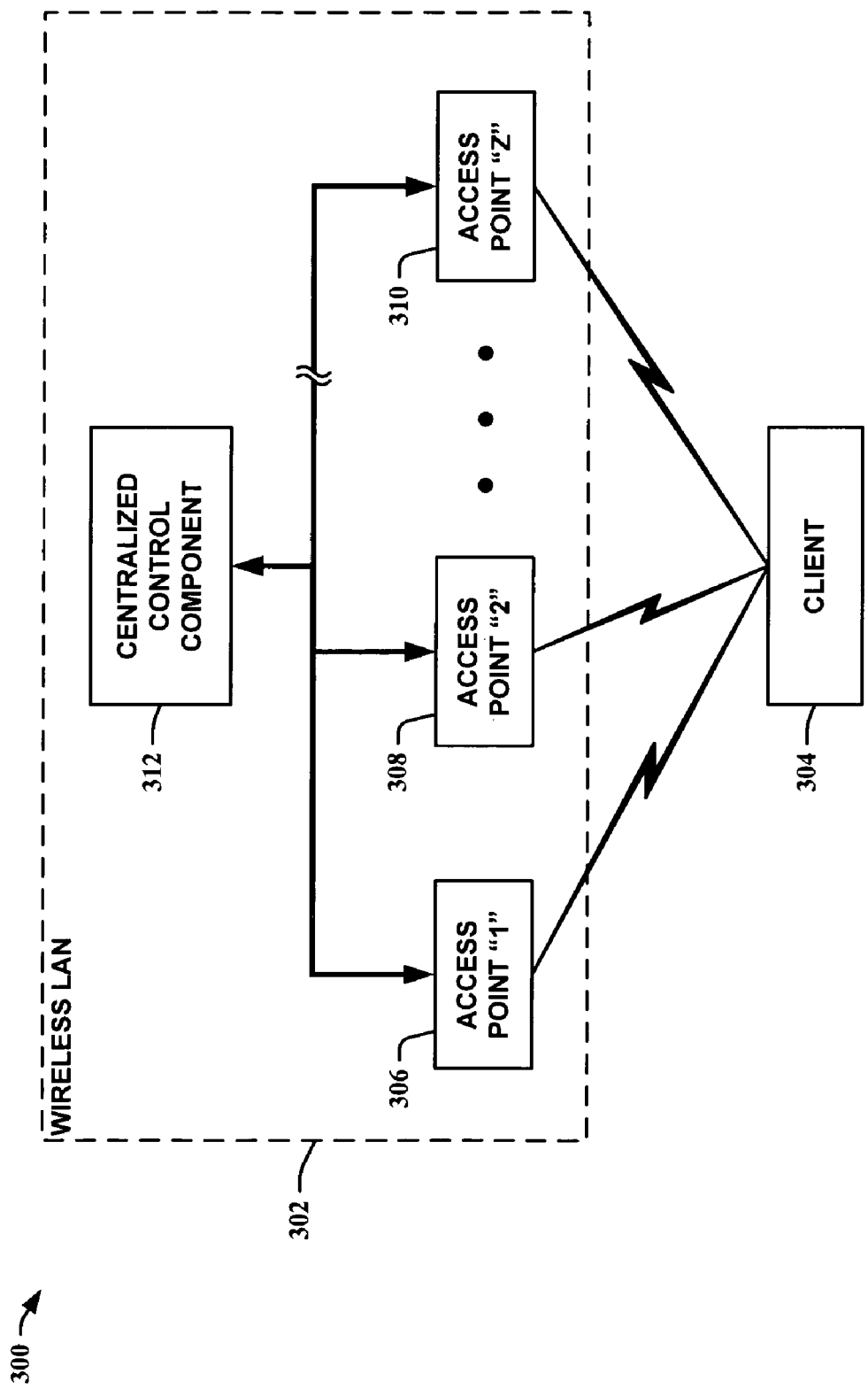
FIG. 3 is an illustration of a wireless LAN employing a wireless LAN data throughput maximization system in accordance with an aspect of an embodiment.

Turning to FIG. 3, an illustration of a wireless LAN 302 employing a wireless LAN data throughput maximization system 300 in accordance with an aspect of an embodiment is depicted. The wireless LAN data throughput maximization system 300 is comprised of a centralized control component 312 and access points "1-Z" 306-310, where Z is an integer from one to infinity. A client 304 can interact wirelessly with the access points "1-Z" 306-310. The centralized control component 312 provides AP beacon power control for the access points "1-Z" 306-310 to maximize data throughput and/or optimize power of the wireless LAN 302. For example, if access point "2" 308 has heavy client demand, the centralized control component 312 can reduce the beacon power level for access point "2" 308 and/or raise the beacon power for access point "1" 306 and/or access point "Z" 310. The client 304 typically automatically attempts to acquire the stronger signal from access point "1" 306 or access point "Z" 310 when access point "2" 308 is no longer receivable. Thus, by controlling the power levels of the access points "1-Z" 306-310, the client 304 can be manipulated into accessing the wireless LAN 302 at a desired access point without any modifications to the client itself. In another instance, the functions of the centralized control component 312 can be located in one of the access points "1-Z" 306-310 or distributed among the access points "1-Z" 306-310 rather than at a central location. Thus, interaction between the access points "1-Z" 306-310 may be necessary to coordinate access point power levels.

Previous studies of public-area wireless networks have shown that client service demands are highly dynamic in terms of both time of day and location and that client load is often distributed unevenly among wireless access points (APs) (see, e.g., A. Balachandran, G. M. Voelker, P. Bahl, and V. Rangan, Characterizing user behavior and network performance in a public wireless lan, In *Proc. of ACM SIGMETRICS*, June 2002; M. Balazinska and P. Castro, Characterizing mobility and network usage in a corporate wireless local-area network, In *Proc. of ACM MOBISYS*, May 2003; D. Schwab and R. Bunt, Characterizing the use of a campus wireless network, In *Proc. of IEEE INFOCOM*, March 2004; and D. Tang and B. M, Analysis of a local-area wireless network, In *ACM MobiCom*, pages 1-10, August 2001). Clients tend to localize themselves in particular areas of the network for various reasons, such as availability of favorable network connectivity, proximity to power outlets, classrooms, meeting rooms, and/or geographic constraints of other services (e.g., airport gate area with arriving and departing flights). A consequence of such behavior is sporadic client congestion at popular locations within the network. At any one time, a large percentage of mobile clients communicate with a small subset of the APs. These client concentrations create an unbalanced load in the network and complicate capacity planning, making it difficult to accommodate heavy, concentrated load in different parts of the network without significant, and costly, over-engineering.

The mapping between clients and the APs that service them is a critical determinant of system performance and resource usage. An AP can get seriously overloaded even when several nearby APs are lightly loaded. This is because a majority of the WiFi cards associate with the APs with the loudest beacons (i.e., the strength of the received beacon signal is highest among all neighboring APs). This is referred to as the basic association scheme.

One way to address this issue is to modify the client association algorithm to incorporate the AP's load in addition to the received signal strength indicator (RSSI) of the AP's beacon. A client associates with the AP that is lightly loaded and whose beacons have a highest RSSI value. This technique and its different variants have been proposed by researchers (see, e.g., I. Papanikos and M. Logothetis, A study on dynamic load balance for ieee 802.11b wireless lan, In *Proc. COMCON*, 2001; Y. Fukuda, T. Abe, and Y. Oie, Decentralized access point selection architecture for wireless lans—deployability and robustness for wireless lans, In *Proc. of IEEE VTC*, September 2004; G. Judd and P. Steenkiste, Fixing 802.11 access point selection, In *ACMSIGCOMM Poster*, August 2002; A. Balachandran, P. Bahl, and G. M. Voelker, Hot-spot congestion relief in public-area wireless networks, In *SIGCOMM Comput. Commun. Review*, 2002; and Y. Bejerano, S. J. Han, and L. E. Li, Fairness and load balancing in wireless lans using association control, In *Proc. of ACM Mobicom*, 2004), and adopted by vendors of wireless LAN products (see, e.g., Prosafe 802.11g wireless access point—model wg302, http://www.netgear.com/products/details/WG302.php/; Cisco aironet 350 series, http://www.cisco-.com/warp/public/cc/pd/witc/ao350ap/; and Agere system: Firmware update for orinoco pc cards v7.28—spring 2001 release, April 2001). The problem is that this technique requires support from both APs and clients. APs have to communicate their current load to the client, and the client AP selection algorithm has to incorporate the AP's load information. In practice, clients in public areas are generally heterogeneous, i.e., they use wireless cards from different vendors or wireless cards that are running older "legacy" software. Consequently, such schemes provide limited benefit.

To achieve efficient resource usage without requiring changes to client software, instances herein utilize cell breathing techniques. A form of cell breathing is utilized in cellular telephony (e.g., 2G, 3G, CDMA, CDMA200 and WCDMA systems) (see, e.g., L. Du, J. Bigham, and L. Cuthbert, A bubble oscillation algorithm for distributed geographic load balancing in mobile networks, March 2004 and J. Qiu and J. Mark, A dynamic load sharing algorithm through power control in cellular cdma, September 1998). It is defined as the constant change in the geographical area covered by the cell tower. When the cell becomes heavily loaded, it shrinks, and the lightly loaded neighboring cells expand. In this way, client traffic from the overloaded cell is redirected to neighboring cells, and consequently, the overall system is load balanced.

In WLANs, cell breathing can be implemented by controlling the transmission power of an AP's beacon packets. The transmission power of data packets is not altered, however, to avoid degrading clients' performance. More specifically, when the signal-to-noise ratio (SNR) of data packets reduces, the AP may see higher data packet losses, or even adapt to a lower sending rate, both of which degrade the client's performance. In comparison, changing the transmission power of beacon packets only affects how clients associate with APs, and does not affect the loss rate or sending rate of data packets.

The power control provided herein does not require any change to client software or to the standard. Clients continue to associate with an AP with the strongest beacon. APs manage their load by adjusting the beacon packets' transmission power. In this way, the AP's coverage area is reduced or expanded transparently to the client, adapting to client demands and balancing the traffic load across the network. Because this approach does not require modifications to clients, its deployment cost and time is small. Moreover, cell breathing is effective for both legacy clients that employ the basic association scheme and the new clients that employ load-aware association scheme. Thus, its benefits can be fully realized immediately with traditional systems as well.

Finding the appropriate power assignment at APs to automatically achieve load balancing and/or data throughput maximization is a challenging problem. Cell breathing algorithms proposed for cellular networks are based on local heuristics and do not provide performance guarantees (see, Du, Bigham, and Cuthbert 2004 and Qiu and Mark 1998). Power control algorithms provided herein can be employed for the following two cases: (i) APs are able to adjust their power to any level (continuous-power assignment), and (ii) APs are able to adjust their power to only some discrete power levels (i.e., discrete-power assignment).

To develop an algorithm for continuous-power assignment, a duality-based approach is utilized. The duality in linear and convex programs has proven effective for algorithm designs (see, V. V. Vazirani, *Approximation algorithms*, Springer-Verlag, Berlin, 2001). It has been also used in analysis and design of congestion control mechanisms in the Internet (see, F. Kelly, Mathematical modeling of the internet, *Mathematics Unlimited—2001 and Beyond*, Springer-Verlag, pages 685-702, 2001; S. Low and D. Lapsley, Optimization flow control, i: Basic algorithm and convergence, *IEEE/ACM Transactions on Networking*, Vol 7, pages 861-875, 1999; and S. Low, L. Peterson, and L. Wang, Understanding vegas: A duality model, *Journal of ACM*, 49(2), pages 207-235, 2002). The duality-based approach uses linear programming to formulate the problems, and uses linear programming duality and the complementary slackness conditions to derive algorithms and prove their correctness.

More specifically, in many situations, one can see dual variables as shadow prices. In the context herein, the shadow prices correspond to the AP power. In other words, similar to a market mechanism in which the price determines the demand for a commodity, the demands assigned to an AP can be changed by adjusting its power. The challenge is to adjust the powers of all neighboring APs at the same time in such a way that their loads remain balanced.

When client demands are homogeneous (i.e., all clients have the same demand), such a power assignment can be computed—the powers of all APs can be set in such a way that after all the clients choose their AP based on RSSI, either all the clients can be served by the APs or all the APs are fully utilized. For heterogeneous demands (i.e., clients can have different demands), the same approach can be applied, and it can be proven to completely satisfy at least N−K clients, where N is the number of clients, and K is the number of APs (Note that K is often much smaller than N in practical scenarios).

A primal-dual combinatorial algorithm based on the matching theory is also provided, which is applicable to a more general setting. In this case, it is assumed that received power is proportional to the transmission power, but no assumption is made concerning any relationship between the received power and the distance (the algorithm does not even require the knowledge of the distance between APs and clients). This algorithm is further described infra. It is based on the insight that the problem has similarity to market equilibrium problem (see, N. Devanur, C. Papadimitriou, A. Saberi, and V. Vazirani, Market equilibrium via a primal-dual-type algorithm, In *FOCS*, 2002; K. Jain, A polynomial-time algorithm for computing an arrow-debreu market equilibrium for linear utilities, In *FOCS*, 2004; and R. Garg and S. Kapoor, Auction algorithms for market equilibrium, In *STOC, pages 511-518*, 2004). Based on the same insight, the ideas of the auction-based distributed algorithms can be applied for computing market equilibria (see, Garg and Kapoor 2004), and develop into a distributed algorithm for the problem.

For discrete-power assignment, a greedy algorithm is utilized. The high level formulation of the algorithm is as follows. The powers of all APs are set to the highest value, and then the best power configuration is chosen that results from iteratively decreasing the power of overloaded APs. Moreover, it only requires knowledge of an AP's load. If there exists a power assignment such that each AP has capacity to accommodate the demands assigned to it, the algorithm can find the solution in a polynomial time. Two extensions to the above algorithms are also considered: (1) dynamic adjustment of AP's power in response to changes in client's load while limiting the number of hand-offs, and (2) minimizing AP's transmission power to reduce interference.

Four algorithms for continuous-power assignment are provided. The first three algorithms assume that APs can estimate the received power at the clients. Among the three algorithms, the first two are optimal (i.e., maximizes the total satisfied client demand) for homogeneous demands, and the third is close to optimal for heterogeneous demands. The fourth algorithm is designed for a more general case, where the only assumption about received power is that it is proportional to the transmission power. A greedy algorithm for discrete power assignment is also provided. This algorithm only requires an AP's load as input. The algorithms are also extended to handle dynamically changing client demands while limiting the number of hand-offs. AP's power is also minimized to reduce interference. These algorithms can be very effective for improving throughput. Under high load, the improvement can be up to 50% or more for uniform client distributions, and up to an order of magnitude for nonuniform distribution of clients' locations.

AP-Centric Approach

An AP-centric approach is provided herein. When an AP becomes heavily loaded, it shrinks its coverage by reducing the transmission power of its beacon packets. This forces redirection of some traffic to a neighboring cell that is lightly loaded, thereby achieving load balancing and/or data throughput maximization. This is substantially different from the previous cell-breathing work in cellular network, which uses heuristics and does not give worst-case performance guarantees. The power control algorithms provided herein are optimal for homogeneous demands and close to optimal for heterogeneous demands. In addition, the algorithms can adapt to changing client demands while limiting the number of clients required to switch to different APs. There is a close relationship between the power assignment problems and the market equilibria (see, e.g., Devanur, Papadimitriou, Saberi, and Vazirani 2002; Jain 2004; and R. Garg and S. Kapoor, Auction algorithms for market equilibrium, In *STOC, pages 511-518*, 2004).

The AP-centric approach can transparently balance load across different APs. The main challenge in this approach is to find appropriate transmission power for each AP such that the total client demand that APs can serve is maximized when clients use the basic association scheme (i.e., associate with the AP with highest RSSI). In order to formally specify the power control problem, a few relevant notations are introduced in TABLE 1.

TABLE 1

Relevant Notations for AP-Centric Approach

| | |
|---|---|
| K | The number of APs |
| N | The number of clients |
| $C_i$ | The capacity of AP i |
| d(i, j) | The distance between AP i and client j |
| α | signal attenuation factor |
| $P_i$ | AP i's power |
| $D_i$ | client i's demand |
| $P_r(i, j)$ | received power from AP i at client j |
| $L_i$ | The total load served at AP i |

Based on the notations listed in TABLE 1, the power control problem is formulated as follows. Given K, N, $C_i$, $D_i$, and d(i,j), the goal is to find the transmission power for each AP i, denoted as $P_i$, to maximize system throughput (i.e., maximizing $\Sigma_i L_i$) given that client j is assigned to AP i when $P_r(i,j) > P_r(i',j)$ for all i'∈{1, 2, ..., K}, and $L_i = \min(C_i, \Sigma D_j)$ for all clients j that are mapped to AP i. The last equation reflects the fact that the maximum client demand the AP i can service, $L_i$, is bounded by its capacity and the total client demands that are assigned to it. Note that when there are multiple APs with similar RSSI, the client is randomly assigned to one of them.

Maximizing Throughput for Continuous Power

Power control algorithms for the cases when APs can adjust their power to any value (i.e., continuous power) are provided herein. The algorithms require APs to estimate the received power at different clients. Subsequently, the algorithm is extended to a more general case that does not require the knowledge of the distance between APs and clients. It only assumes the received power at any location is proportional to the transmission power, which holds in general even under obstruction. Moreover, the discrete-power assignment algorithm requires even less information—only APs' load information is needed.

The received power is estimated at the clients as follows. The received power, $P_r(i,j)$, is a function of transmission power, P(i), and the distance between the client and AP, d(i,j). The function depends on the wireless propagation model in use. The following function is utilized:

$$P_r(i,j) = a * P_i / d(i,j)^\alpha, \quad (Eq. 1)$$

where a is a constant. This power function can incorporate both free-space and two-ray ground reflection models.

In addition, other wireless propagation models can also be incorporated as follows. When the wireless propagation does not follow (Eq. 1) (e.g., under obstruction), the actual wireless propagation can be approximated by introducing virtual distance, where the virtual distance follows (Eq. 1). More specifically, APs collect the measurement of transmission power and received power, and then approximate the actual wireless propagation by finding d'(i,j) (virtual distance), α' (virtual attenuation factor), and a' that fit the model $P_r(i,j) = a'*P_i/d'(i,j)^{\alpha'}$, where $P_r(i,j)$ and $P_i$ are from the measurement. Then the power assignment is applied to the virtual distances and virtual attenuation factor. Conceptually, this is similar to Internet distance embedding (see, e.g., GNP T. S. E. Ng and H. Zhang, Predicting Internet network distance with coordinates-based approaches, In *Proc. of IEEE INFOCOM*, June 2002), which embeds a complicated Internet space onto a simple geometric space. In the present case, a complicated space is embedded, which describes actual wireless propagation, onto a simpler space that follows (Eq. 1).

Maximizing Throughput for Homogenous Demands

Power control algorithms are designed for homogeneous client demands. Without loss of generality, each client is considered to have one unit of demand (since client demands are homogeneous, client demands and AP capacity can always be scaled to make the client demand to be one unit). First, find a mapping of clients to APs such that either all clients' demands are satisfied or the total capacity of all APs are exhausted. Such a mapping maximizes the objective—the total satisfied demand, since the total satisfied demand cannot exceed the total client demand or AP's capacity. There exists a set of powers that enforces this assignment when each client selects its AP based on RSSI. Next, two algorithms are derived to find the set of powers that enforces this assignment. The first algorithm is based on solving a linear program. The second algorithm is combinatorial and has a better running time.

Finding the Mapping

A polynomial-time algorithm is developed to find a mapping of clients to APs such that either clients' demands are satisfied or the total capacity of all APs is exhausted. This mapping is called a perfect assignment. There exists a set of powers for APs that enforces this assignment under homogeneous client demands. The proof uses linear programming duality and complementary slackness conditions.

The algorithm to find the assignment is as follows:

FindAssignment1 Algorithm
1. Given an instance of the power control problem as specified supra, the following weighted bipartite graph $G(A, C, E)$ can be constructed, where A is the set of APs, and C is the set of clients. There is an edge between each AP i and each client j. The weight of the edge from AP i to client j is equal to $w_{ij} = \alpha \ln(d(i,j))$.
2. Find the minimum weight bipartite matching in G, where the capacity of every client is 1, and the capacity of an AP i, is $C_i$. In other words, among all the maximal assignments of clients to access points in which a client can be assigned to at most one AP and an AP i can be matched to at most $C_i$ clients, find the matching with the minimum weight that covers either all the clients or all the APs.

Note that the minimum weighted perfect matching problem (even in general graphs) can be solved in polynomial time (see, J. Edmonds, Maximum matching and a polyhedron with 0, 1-vertices, *J. Res. Nat. Bur. Standards* Sect. B, 69B: 125-130, 1965 and J. Edmonds, Paths, trees, and flowers, *Canad. J. Math.*, 17:449-467, 1965). For bipartite graphs, simple primal-dual algorithms are known for this problem (see, e.g., D. B. West, *Introduction to graph theory*, Prentice Hall Inc., Upper Saddle River, N.J., 1996). In addition, the integrality gap of the natural linear programming formulation is one, which means that the optimal solution can be found by solving a linear program (see, e.g., A. Schrijver, *Combinatorial optimization, Polyhedra and efficiency*, volume 24 of *Algorithms and Combinatorics*, Springer-Verlag, Berlin, 2003). Below, it is shown that there exists a set of powers that enforce the assignment obtained by the above algorithm.

Theorem 1: There exists a set of powers that enforces the assignment obtained by FindAssignment1 algorithm.

Proof: First assume that the perfect matching covers all clients. The other case where the perfect matching covers all APs is considered infra. The minimum weighted perfect matching problem can be formalized as follows:

$$\begin{aligned} \text{minimize} \quad & \sum_{i \in C, j \in A} w_{ij} x_{ij} & \text{(Eq. 2)} \\ \text{subject to} \quad & \forall i \in C \quad \sum_{j \in A} x_{ij} = 1 \\ & \forall j \in A \quad \sum_{i \in C} x_{ij} \leq C_j \\ & \forall i \in C, j \in A \quad x_{ij} \geq 0 \end{aligned}$$

In the above linear program, $x_{ij}=1$ indicates that client i is assigned to AP j in the matching. The first constraint indicates that each client is assigned to at most one AP. The second constraint shows that AP j is assigned to at most $C_j$ clients. The objective is to minimize the weight of the resulting matching. Since there exists an assignment that covers all clients, this linear program has a feasible solution. As mentioned supra, it is known that in bipartite graphs the integrality gap of the above LP is one. Thus, there is an optimum solution with 0-1 variables.

The dual of the above linear program is as follows:

$$\begin{aligned} \text{maximize} \quad & \sum_{i \in C} \lambda_i + \sum_{j \in A} C_j \pi_j & \text{(Eq. 3)} \\ \text{subject to} \quad & \forall i \in C, j \in A \quad \lambda_i + \pi_j \leq w_{ij} \\ & \forall j \in A \quad \pi_j \geq 0 \end{aligned}$$

Let $(x^*_{ij}|i \in A, j \in C)$ denote the optimal solution to the primal program and $(\lambda^*_i, \pi^*_j|i \in A, j \in C)$ denote the optimal solution to the dual program. By setting $\log(P_j) = \pi_j$, the resulting assignment of clients to APs corresponds to the assignment of $x^*_{ij}$'s. In other words, by setting $P_j = e^{\pi_j}$, client i will be assigned to AP j for which $$\frac{P_j}{d_{ij}^\alpha}$$

is maximized, and this assignment is consistent to the mapping as specified by $x^*_{ij}$.

To prove the above claim, first make an observation that by setting $\log(P_j) = \pi_j$, client i will be assigned to AP j for which $$\frac{P_j}{d_{ij}^\alpha}$$

is maximized. This is equivalent to that client i is assigned to the AP j for which ln $$\frac{P_j}{d_{ij}^\alpha} = \pi_j - w_{ij}$$

is maximized (or equivalently, $w_{ij} - \pi_j$ is minimized). Then it is shown that this assignment is consistent to the assignment specified by $x^*_{ij}$. From the dual program, it is clear that $\lambda_i = \min_{j \in A}(w_{ij} - \pi_j)$. From complementary slackness conditions, $x_{ij} > 0$ if and only if $\lambda_i + \pi_j = w_{ij}$. Thus, after this power assignment client i is assigned to AP j if and only if $x_{ij} > 0$. Therefore the power assignment realizes the minimum weighted matching assignment.

Next, the other case is considered where there exists an assignment that fills all APs' capacity, but does not satisfy all clients' demands. The following linear program can be utilized to specify the minimum weighted perfect matching problem:

$$\text{minimize} \quad \sum_{i \in C, j \in A} w_{ij} x_{ij} \qquad \text{(Eq. 4)}$$
$$\text{subject to} \quad \forall\, i \in C \quad \sum_{j \in A} x_{ij} \leq 1$$
$$\forall\, j \in A \quad \sum_{i \in C} x_{ij} = C_j$$
$$\forall\, i \in C, j \in A \quad x_{ij} \geq 0$$

The rest of the proof is similar to the first case. The dual of the above linear program can be written the optimal set of powers found to fill the capacity of all APs. Again, using complementary slackness conditions, this power assignment can be proven to show that it realizes the minimum weighted matching assignment.

Finding the Power Assignment

The above description described how to assign clients to APs to achieve maximum throughput. Below, two power assignment algorithms are shown that enforce the client-to-AP assignment derived above.

Linear Programming Based Algorithm

Below is the algorithm to compute power assignment for APs using a linear program. The proof of its correctness is essentially in the proof of Theorem 1.

FindPowers1 Algorithm

1. Solve the following linear program (Linear Program (Eq. 3)).

$$\text{maximize} \quad \sum_{i \in C} \lambda_i + \sum_{j \in A} C_j \pi_j \qquad \text{(Eq. 5)}$$
$$\text{subject to} \quad \forall\, i \in C, j \in A \quad \lambda_i + \pi_j \leq w_{ij}$$
$$\forall\, j \in A \quad \pi_j \geq 0$$

2. Let $(\{\lambda^*_i | i \in C\}, \{\pi^*_j | j \in A\})$ be the optimal solution to the above linear program.
3. Set $P_j = e^{\pi^*_j}$ for all APs j.
4. Scale all powers by the same factor such that $P_j \geq M_j$ where $M_j$ is the minimum power at which AP j can reach all the clients that it has to serve.

Combinatorial Algorithm

Next, a combinatorial algorithm is provided to find the power assignment that enforces the client-to-AP assignment derived previously. Assume that the client to AP assignment $x_{ij}$'s for $i \in C, j \in A$ of clients to APs are given. Let $P_j$ denote the set of powers AP j use to realize the given assignment. If $x_{ij} = 1$, $$\frac{P_j}{d_{ij}^\alpha} \geq \frac{P_k}{d_{ik}^\alpha}$$

for any AP k. By setting $\pi^*_k = -\ln(P_k)$ and $w_{ik} = -\alpha \ln(d_{ik})$, it is known that $x_{ij} = 1$ if and only if $-\pi^*_j + w_{ij} \geq -\pi^*_k + w_{ik}$ for all clients i and APs j and k. For an AP $j \in A$, let $f_j$ be the farthest client in C that is connected to j ($x_{f_j j} = 1$). Let $M_j$ be the minimum transmission power at which an AP j can reach client $f_j$ and let $m_j = -\ln(M_j)$. The power of AP j should be no less than $M_j$, i.e., $\pi^*_j \leq m_j$. Thus, a set of powers results in the desirable assignment if and only if it satisfies the following inequalities:

$$\forall\, i \in C, j \in A: x_{ij} = 1, \quad \forall\, k \in A \quad -\pi^*_j + \pi^*_k \geq -w_{ij} + w_{ik}$$
$$\forall\, j \in A \quad \pi^*_j \leq m_j$$

The above set of inequalities corresponds to a polytope on which any linear function can be optimized as a linear program. For example, if it is desirable to find a set of powers such that the sum of the logarithm of power is minimized, the following linear program can be solved:

$$\text{maximize} \quad \sum_{j \in A} \pi^*_j \qquad \text{(Eq. 6)}$$
$$\text{subject to}$$
$$\forall\, i \in C, j \in A: x_{ij} = 1, \quad \forall\, k \in A \quad \pi^*_j - \pi^*_k \leq w_{ij} - w_{ik}$$
$$\forall\, j \in A \quad \pi^*_j \leq m_j$$

The above linear program can be solved combinatorially using the shortest path algorithm. This is more efficient than solving a linear program. For example, Dijkstra's algorithm can find the shortest paths in $O(|V|^2)$, where $|V|$ is the number of vertices in the graph. This problem is converted into finding the shortest paths as follow. A directed graph $D(A \cup \{r\}, E)$ is constructed, where A is the set of APs, r is an extra root vertex, and E is the set of edges between them. The length of edges in graph D are as follows: there is an edge from each vertex $j \in A$ to r with length $l_{jr} = m_j$. If client $i \in C$ is assigned to AP $j \in A$, an edge from $j \in A$ to k is put in graph D of length $l_{jk} = \min_{i \in C: x_{ij} = 1}(w_{ij} - w_{ik})$. Let $p_j$ be the shortest path from vertex j to r in graph D. In fact, the inequalities in the program are the triangle inequalities for the shortest path to the root r. Thus, it is not hard to see that $p_j$'s satisfy all inequalities of Linear Program 6.

Hence, the following combinatorial algorithm:

FindPowers2 Algorithm

1. Given an instance of the power control problem as specified in above, the following weighted bipartite graph $G(A,C,E)$ can be constructed, where A is the set of APs, C is the set of clients, and E is the set of edges between them. There is an edge between each AP i and each client j. The weight of the edge from AP i to client j is equal to $w_{ij} = \alpha \ln(d(i,j))$.
2. Find the minimum weight bipartite matching in G, where the capacity of every client is 1, and the capacity of an AP i is $C_i$. In other words, among all the maximal assignments of clients to access points in which a client can be assigned to at most one AP and an AP i can be matched to at most $C_i$ clients, find the one with minimum total weight.

3. Construct a directed graph $D(A \cup \{r\}, E)$. For two APs j and k, set $l_{jk} = \min_{i \in C: x^*_{ij}=1}(w_{ij}-w_{ik})$. For an edge jr from AP j to r, set $l_{jr} = m_j$.
4. Set $p_j$ as the shortest path from AP j to r in graph D.
5. Set the power of AP j, $P_j = e^{-P_j}$.

The FindPowers2 Algorithm outputs a set of powers that enforces the most efficient assignment. The proof of correctness of this algorithm is from Theorem 1, and the fact that the shortest paths to vertex r in graph D is a feasible solution to Linear Program 6. The main advantage of FindPowers2 Algorithm over FindPowers1 Algorithm is that this algorithm is combinatorial and has a better running time. Moreover, FindPowers2 Algorithm can also be applied to optimize the sum of the logarithms of powers of APs, while maximizing throughput.

Multiple Preferred APs

When each client selects the AP with the maximum RSSI, the set of powers from FindPowers1 Algorithm and FindPowers2 Algorithm maximizes throughput. However, for a given set of powers, it is possible for a client to have multiple APs with similar RSSI. All these APs are called as this client's preferred APs. In such a case, a client will randomly choose among these preferred APs, and the performance may degrade, since the client may choose an AP other than the one in the assignment derived above. To handle this case, FindPowers2 Algorithm is utilized to enforce stronger inequalities, i.e., instead of the inequality $\pi^*_j - \pi^*_k \leq w_{ij} - w_{ik}$, the inequality $\pi^*_j - \pi^*_k \leq w_{ij} - w_{ik} - \beta$ is employed, where $\beta > 0$ is a given threshold ($\beta$ represents the smallest signal strength difference a client can sense). The advantage of these stronger inequalities is that it ensures each client has a unique preferred AP, and the performance degradation caused by random tie breaking is avoided. Note that this change to the linear program may make it infeasible due to stronger inequalities. But this is a useful heuristic, which can be utilized to evaluation, to find a set of powers that yield a unique assignment. When the stronger inequalities cannot be satisfied, the random tie breaking is used for assigning a client that has multiple preferred APs.

Maximizing Throughput for Heterogeneous Demands

A power control algorithm is shown for heterogeneous client demands. Consider two cases: splittable and unsplittable demands. Under unsplittable demands, the benefit of satisfying a demand is gained only if this demand is satisfied completely. This setting is motivated by real-time services, e.g., video streaming. In these services, if the demand cannot be completely satisfied, it is better not to service the demand, because the video requires certain bandwidth to achieve an acceptable performance. In the case of splittable demands, the throughput from a demand is proportional to the fraction of the demand that is provided by APs. The main application of this setting is in the best-effort services such as web browsing. In these settings, a benefit can be derived even if the transfer of files cannot occur at a desirable data rate.

Unsplittable Heterogeneous Demands

It is not hard to see that under unsplittable demands the problem of maximizing throughput is NP-complete, since the assignment problem is a multiple knapsack problem (see, C. Chekuri and S. Khanna, A ptas for the multiple knapsack problem, In *SODA*, pages 213-222, 2000). In fact, a polynomial time $1+\epsilon$—approximation (PTAS) is known for the multiple knapsack problem Chekuri and Khanna 2000. The power assignment problem to maximize throughput for the unsplittable heterogeneous demands is APX-hard. The proof of this fact is via a reduction from the generalized assignment problem (GAP) (see, Chekuri and Khanna 2000), where each item can be assigned to a subset of bins (and not to all of them). An instance of GAP can be reduced to the power assignment problem by putting very large distances between the items and bins that cannot hold these items.

Here, an algorithm based on linear programming is presented. This algorithm solves the problem approximately when the number of clients is much larger than the number of APs. Let $D_i$ denote the demand from client i. The linear program formulation above changes to:

$$\text{minimize} \quad \sum_{i \in C, j \in A} w_{ij} x_{ij} \quad \text{(Eq. 7)}$$

$$\text{subject to} \quad \forall i \in C \quad \sum_{j \in A} x_{ij} = 1$$

$$\forall j \in A \quad \sum_{i \in C} D_i x_{ij} \leq C_j$$

$$\forall i \in C, j \in A \quad x_{ij} \geq 0$$

The dual program becomes:

$$\text{maximize} \quad \sum_{i \in C} \lambda_i + \sum_{j \in A} C_j \pi^*_j \quad \text{(Eq. 8)}$$

$$\text{subject to} \quad \forall i \in C, j \in A \quad D_i \lambda_i + \pi^*_j \leq w_{ij}$$

$$\forall i \in C \quad \lambda_i \geq 0$$

It can be shown that when the number of clients is much more than the number of APs, Linear Program 7 has solutions in which most of the $x_{ij}$'s are either 0 or 1. These solutions are simply the corner points of the polyhedra. These are called extreme point solutions. They are also called basic feasible solutions. The following algorithm is utilized to find power assignment.

FindPowers3 Algorithm for heterogeneous demands:
1. Find the optimum extreme point solution $x^*_{ij}$ to the linear program (Eq. 7), and its corresponding dual optimum $\lambda^*_i$ and $\pi^*_j$ to the dual linear program (Eq. 8).
2. Set $P_j = e^{\pi_j}$.
3. Connect every client i to the AP j for which $x^*_{ij} = 1$ if such j exists. Otherwise do not serve i.
4. Scale all powers by the same factor such that $P_j \geq M_j$, where $M_j$ is the minimum power by which AP j can reach all the clients that it has to serve.

As noted before, unlike the linear program (Eq. 2), the primal linear program (Eq. 7) does not always have an integral (0 or 1) solution. In other words, it might be the case that for some i and j, $0 < x^*_{ij} < 1$. Client j is assigned integrally if $x^*_{ij} = 1$ for some i. Otherwise, it is fractionally set.

The following facts are implied by the theory of linear programming. The proof can be found in A. Schrijver, *Theory of linear and integer programming*, John Wiley & Sons, New York, 1986.

Lemma 1: The extreme point optimum solution to the primal program $x^*$ assigns at least N−K clients to APs integrally, where N is the number of clients, and K is the number of APs.

Proof: Let r denote the number of variables in the primal linear program (Eq. 7). An extreme point solution is defined by the constraints in the linear program, where the inequality constraints are changed to equality constraints. Among these r independent variables, at least r−K−N should be of type $x_{ij} \leq 0$. Their corresponding variables will be zero due to the last constraint in linear program (Eq. 7). Therefore, the number of non-zero $x^*_{ij}$'s are at most N+K. Let a and P denote the number of clients that are assigned integrally and fractionally, respectively. Therefore, $\alpha+\beta=N$ and $\alpha+2\beta \leq N+K$ (since for each client assigned fractionally, there are at least two non-zero $x^*_{ij}$'s). Thus, $\alpha \geq N-K$.

In most cases, the number of clients is much larger than the number of APs. In that case, even by dropping the clients that are assigned fractionally by the above program, the total satisfied demand is still close to the optimal. The proof of the next lemma is similar to that of Theorem 1, and follows from the complementary slackness conditions.

Lemma 2: The assignment of clients to the APs defined by the optimum primal solution x* can be achieved by setting the power of APs according to $P_j = e^{\pi^*_j}$. In other words, the optimal primal solution assigns the clients i only to the AP j for which the ratio $$\frac{P_j}{d_{ij}^\alpha}$$

is maximized.

Proof: From the dual program, it is clear that $D_i \lambda^*_i = \min_{j \in A} (w_{ij} - \pi^*_j)$. From complementary slackness conditions, $x^*_{ij} > 0$ if and only if $D_i \lambda^*_i + \pi^*_j = w_{ij}$. This means that $x^*_{ij} > 0$ if and only if $w_{ij} - \pi^*_j$ is minimized (or equivalently, $\pi^*_j - w_{ij}$ is maximized). Since $\pi^*_j = \ln P_j$ and $w_{ij} = \alpha \ln d_{ij}$, $x^*_{ij} > 0$ if and only if $$\frac{P_j}{d_{ij}^\alpha}$$

is maximized.

Splittable Heterogeneous Demands

The algorithms for splittable heterogeneous demands are similar to that of the homogeneous demands. Here, two ways are given to solve this problem. The first algorithm is to split the demands into small uniform demands and use FindPowers2 Algorithm. The second algorithm is based on solving the linear programs (Eq. 7) and (Eq. 8). As noted above, the primal linear program (Eq. 7) does not always have an integral (0 or 1) solution. However, as splitting the demands are allowed, the fractional solution to linear program (Eq. 7) is a valid solution. Therefore, the optimal solution to the dual linear program (Eq. 8) can be utilized to enforce the most efficient assignment of clients to APs. The proof of correctness of this algorithm follows from the proof of Theorem 1.

Continuous Power Assignment Based on Primal-Dual

A continuous power assignment algorithm for a more general received power function is now provided. The only assumption is that the received power is proportional to the transmission power, which holds in general even under obstruction. No assumption is made regarding any relationship between the received power and the distance.

There is similarity between the problem and market equilibrium problem (see, Devanur, Papadimitriou, Saberi, and Vazirani 2002; Jain 2004; and Garg and Kapoor 2004). Market equilibrium has two popular settings. The one relevant to the problem is called Fisher setting. In the Fisher setting, there are two kinds of entities: sellers and buyers. Sellers want to sell a set of goods they have. Buyers want to buy a set of goods that they can afford and provides the maximum happiness, called utility in economics. Buyers naturally put a demand on goods from the various sellers depending upon the prices of the goods each seller set. The classical market equilibrium theorem says that under certain mild conditions sellers can set the prices so that the demand of their products is exactly equal to the supplies they have.

The wireless LAN AP problem is quite analogous. Instead of buyers, there are clients; instead of sellers there are APs; instead of a supply of goods, there is a capacity on each AP; Instead of prices, there are power levels at each AP. Since there is a simple setting: each client connects to the AP that gives the best reception, the simplest setting of market equilibrium is discussed—Fisher setting with linear utilities (i.e., each buyer's utility for a set of goods is a linear function).

There has been numerous work on the market equilibrium problem with linear utilities. There are three kinds of algorithms currently known: (i) convex programming based (see, Jain 2004), (ii) primal-dual based (see, Devanur, Papadimitriou, Saberi, and Vazirani 2002), and (iii) auction based (see, Garg and Kapoor 2004). The first kind of algorithms theoretically provides the fastest known running time and mathematically has been able to provide various properties of the market equilibrium. The drawback is that these algorithms need the input upfront. Auction based algorithms, on the other hand, are truly distributed. In between are the primal dual algorithms: they are not distributed, but still do not require the input upfront.

Here, a primal-dual type algorithm is described. The idea is inspired by Devanur, Papadimitriou, Saberi, and Vazirani 2002 but note that there are specific differences between Devanur, Papadimitriou, Saberi, and Vazirani 2002 and this. One major difference is the loop invariant. Devanur, Papadimitriou, Saberi, and Vazirani 2002 makes sure that all the demands subsume the supplies. From that point onwards, the algorithm keeps trying to increase the prices and reduces the demands so that the demands still subsume the supplies; but not strictly, in other words, total demand is equal to the total supplies.

Clearly, if there is more capacity on the APs, demand cannot subsume the supply. If there is less capacity on the APs, the equilibrium does not even exist. If the total capacity is equal to the total number of clients, the solution is found when the loop invariant is found for the first time. That is, if demand can subsume supply, then the only way in this case is that demand is equal to the supply. So the loop invariant technique of Devanur, Papadimitriou, Saberi, and Vazirani 2002 cannot be followed.

Instead, an arbitrary assignment of positive powers to each AP is utilized as a start. Suppose P is the power assignment vector. The equality graph is defined as follows: one side of the equality graph includes all the clients, and the other side includes all the APs. Suppose there are n clients, and the total capacity on the AP's is at least n. Let j denote the client index, and i denote the AP index. An equality edge is put between i and j when i provides the best reception to j. Note that there can be more than one AP that provides the best reception to a client, but there is always at least one AP that provides the best reception to a client.

Theorem 2: If P is the equilibrium power, the equality graph has a complete matching for the clients, i.e., the size of the maximum matching is n. This means that the total throughput is maximized.

To prove the above theorem, define the deficiency of a power assignment as the minimum number of clients remain unserved. In other words, the deficiency is n minus the size of the maximum matching in the equality subgraph. Suppose S is a set of clients. Define the neighborhood capacity of S as the total capacities of all those APs that have at least one edge from S. Suppose the neighborhood capacity of some set S is $|S|-k$. The deficiency of the power assignment is at least k. In fact, in every matching at least k clients from S itself remain unmatched. A well known fundamental theorem in the graph theory says that the converse is also true.

The following lemma can be proved in more than one way, and is a well known fundamental theorem in the graph theory. A special case of this theorem, where k=0, is called Hall's theorem.

Lemma 3: If the deficiency is k, there exists a set S of the clients such that the neighborhood capacity of S is $|S|-k$.

This lemma clearly implies that in fact k unmatched clients belong to S. The smallest such S is utilized. By using the submodularity of the deficiency function or the supermodularity of the neighborhood capacity function, one can prove that there exists a unique such S. The intuition behind taking the smallest S is that it is desirable to corner the unmatched k clients as much as possible so that it is possible to do something for them.

Since S has k unmatched clients, and the neighborhood capacity of S is exactly k less than the clients in S, all the neighbor capacity will be assigned to S, and S still needs some more neighborhood capacity. In this case, all the APs not in the neighborhood of S are taken, and the power raised on them. Powers are not raised arbitrarily. Instead, it is done in a systematic fashion. The power of every AP not in the neighborhood of S is multiplied by a variable x. Set x=1. The value of x is increased gradually. The following can be easily proved by the power model of received powers. All the edges from the complement of S to the neighborhood of S do not remain equality edges, so they are removed. Note that these edges are not needed in the first place. All other equality edges remain equality edges. Eventually some edges from S to the complement of the neighborhood set of S will be eventually added into the set of equality edges. At this point, x is stopped from increasing. This is called a phase. The following lemma is self evident.

Lemma 4: After a phase, exactly one of the following two events will happen.
1. The size of the smallest set with deficiency k has increased. In fact, the new smallest set with deficiency k contains S.
2. The deficiency of the new power assignment has decreased. It is called an iteration.

The algorithm terminates when there is no deficient set. Clearly the number of iterations in this algorithm is at most the number of clients, and in each iteration the number of phases is at most the number of clients. Hence, the algorithm terminates in time $O(n^2)$ number of matching computations.

Maximizing Throughput for a Discrete Set of Powers

A variation of the problem is one in which the powers of APs can only take certain discrete values. This problem is motivated by the fact that APs from many vendors have only a handful power levels (see, e.g., Cisco Aironet—Cisco aironet 350 series, http://www.cisco.com/warp/public/cc/pd/witc/ao350ap/). In this case, the solution of the linear programming is not directly applicable because the power values computed by the linear program could be arbitrary fractional numbers. One approach to remedy this issue is to round the solution of our linear program to the closest discrete values that APs can take. However rounding may introduce significant performance degradation. Thus, an algorithm that finds the power assignments in a more direct way is provided.

Assume that the power of an AP $a \in A$ can be set to one of the values from the set $\{P_1^a, P_2^a, \ldots, P_h^a\}$, where $P_1^a \geq P_2^a \geq \ldots \geq P_h^a = 0$. The algorithm starts by setting the power of all APs to the maximum power level, $P_1^a$; then it tries to improve the solution in every step as follows.

FindPowers4 Algorithm for discrete powers:
1. Assign the maximum power $P_1^a$ to each AP a.
2. while there exists an AP a of power $P_{i_a}^a$, $1 \leq i_a \leq h$, such that the AP cannot accommodate all the demands assigned to it, change the power of AP a to $P_{i_a+1}^a$.
3. Among all power configurations generated in the above step, choose the one that yields the highest throughput.

The above algorithm is very efficient: the number of iterations in the while loop is at most hK. Therefore, the algorithm has a polynomial running time. Next, the optimality of the algorithm is proven under a certain condition, which is formally specified in Theorem 3.

Theorem 3: If there exists a power assignment such that each AP a has capacity to accommodate all the demands assigned to it, FindPowers4 Algorithm finds such an assignment in polynomial time.

Proof: Let F be the feasible (optimal) power assignment. Suppose for $1 \leq i_a \leq h$, the power of AP a in F is $P_{i_a}^a$, and the FindPowers4 Algorithm assigns AP a with power $P_{i'_a}^a$. If $i'_a \leq i_a$, a power assignment in which all clients' demands are served without overloading APs is found (since the algorithm terminates at non-zero power only when it finds a solution in which all client demands are satisfied). Next, it is proven that $i'_a \leq i_a$ holds. Suppose by contradiction, during the while loop, there is an AP a to which for the first time a power $P_{i'_a}^a$ for $i'_a = i_a + 1$ is assigned. Since the powers of all other APs are at least the power in the optimal power assignment, the total demands of clients that prefer AP a can be at most the total demands assigned to a in F. This cannot be more than its capacity according to the definition of F. Therefore, it is a contradiction.

Note that the above theorem holds even in the case where the demands are heterogeneous and unsplittable. It is assumed that for any power assignment to APs, every client has a unique preferred AP. When a client has multiple preferred APs (i.e., RSSI from multiple APs are equal or similar to each other), the client has a well-defined deterministic rule for breaking the tie. This tie-breaking rule could be different for different clients. This is a necessary condition, because sometimes it is impossible to set the powers of APs so that every client observes different signal strengths from different APs. Even if such a power assignment exists, it is NP-hard to find it (see, P. Bahl, M. T. Hajiaghayi, K. Jain, V. Mirrokni, L. Qiu, and A. Saberi, Cell breathing in a wireless lans: Algorithms and evaluation, *Microsoft Technical Report*, 2005).

Dynamic Power Assignment

When clients' demands are continuously changing, it is often desirable to find an assignment without requiring many clients to handoff to different APs, since the overhead of handoff is non-negligible. A dynamic algorithm is provided for this purpose. It is assumed that a client will not switch to a different AP, unless its RSSI from a new AP is improved by a threshold. A client i is defined to be happy if it is connected to an AP j, and the RSSI from j is at least $1/\gamma * \max(RSSI_a)$ for all a∈A, where max($RSSI_a$) denotes the maximum RSSI received from all APs, and γ is larger than 1.

The algorithm starts with the existing assignment of clients to APs and finds a number of changes to the existing assignment so that all the clients are happy after the changes. The auction algorithms introduced in D. P. Bertsekas, Linear network optimization: Algorithms and codes, M.I.T. Press, Cambridge, Mass., 1991 are employed to achieve this.

DynamicPowerAssignment Algorithm:
1. Start with the current power assignment and current mapping of clients to APs.
2. Repeat the following procedure until either all the clients are happy or all the APs are completely utilized:
   (a) If a client i is not happy, it tries to find an AP j, for which $\pi_j - w_{ij}$ is maximized. It sends an association request to AP j.
   (b) If an AP j receives an association request from a client i, it accepts the request when it has capacity. Otherwise, it sorts the clients that are connected or requested to connect in the decreasing order of their $\lambda_i - w_{ij}$. Let k be the highest index such that clients 1, 2, . . . , k can be served by AP j. j accepts these clients, and sets its power to $\lambda_k - w_{kj} - \epsilon$.
3. Often, the powers of all APs can be decreased several times. It can then be re-normalized by multiplying all the power values by a constant δ. Clearly, this does not affect the assignment of clients to APs.

The main advantage of the above algorithm is that it tries to only make local adjustments to the existing connections. Moreover, since the changes in the powers are powers of γ, the algorithm converges to the right solution very quickly. Refer to Bertsekas 1991 for a detailed analysis of auction algorithms.

Power Optimization

It is desirable to simultaneously maximize system throughput and minimize APs' power. Power minimization is helpful to reduce interference among different APs. For ease of explanation, homogeneous client demands are considered. The same approach can be applied to splittable heterogeneous client demands. First, the problem of optimizing the power for a given mapping of clients to APs is considered. In this case, Linear Program (Eq. 6) can be written and optimized the power given the assignment of APs to clients. In the following theorem, it is proven that the shortest paths to vertex r in graph D of FindPowers2 Algorithm are in fact the optimal solution to Linear Program (Eq. 6). This in turn gives a combinatorial algorithm to optimize the sum of logarithms of powers for a given assignment.

Theorem 4: Let ($p_j$|j∈A) be the length of the shortest path from vertex j to vertex r in graph D of FindPowers2 Algorithm. Then $p_j$'s are the optimal solution to the Linear Program (Eq. 6).

Proof: Since $p_k$ is the shortest path from k to r, $p_k \leq p_j + l_{kj}$ for any j∈A. So, $p_j - p_k \leq w_{ij} - w_{ik}$ and the vector ($p_j$|j∈A) is a feasible solution for the Linear Program (Eq. 6). In order to show that this vector is the optimal solution to the Linear program (Eq. 6), it is proven that for any feasible solution ($p'_j$|j∈A), $p'_j \leq p_j$ for any j∈A. This is proven by induction on the number of edges on the shortest path from j to r. If the number of edges on the shortest path to r is equal to 1, then $p'_j \leq m_j = p_j$. Assume that $p_j \geq p'_j$ for all node j with the shortest path of size at most t edges between j and r, it is proven that for a node k with the shortest path of k+1 edges from j to r. Since $p_k$ is the shortest path, there exists a vertex k' for which $p_k = p_{k'} + l_{kk'}$. The size of the path from k' to r is at most t, thus $p'_{k'} \leq p_{k'}$. As ($p'_j$|j∈A) is a feasible solution, it is known that $p'_k - p'_{k'} \leq w_{ik} - w_{ik'}$ for any i∈C for which $x_{ik} = 1$. Thus $p'_k - p'_{k'} \leq l_{kk'}$. Using these inequalities, it is obtained that $p'_k \leq p'_{k'} + l_{kk'} \leq p_{k'} + l_{kk'} = p_k$. This proves the induction step.

Power minimization is conditioned on maximizing throughput. This is achieved by ensuring the client-to-AP assignment is the same as that derived previously. Second, a similar approach can be utilized to minimize the sum of AP's powers (while maximizing system throughput). This is done by minimizing the convex function $\Sigma_{j \in A} P_j = \Sigma_{j \in A} e^{-\pi^*_j}$ instead of minimizing $\Sigma_{j \in A} -\pi^*_j$ in Linear Program (Eq. 6) using interior point methods (see e.g., H. Hindi, A tutorial on convex optimization, In *Proceedings of American Control Conference*, 2004). Finally, note that minimizing the power while maximizing the system throughput is sometimes hard. This is proved by showing that finding an assignment of all clients to APs with minimum total power and maximum throughput is APX-hard (see, Bahl, Hajiaghayi, Jain, Mirrokni, Qiu, and Saberi 2005).

Thus, a set of load balancing and/or data throughput maximization algorithms for handling sporadic client congestion in a wireless LAN are provided. The algorithms provide capacity where and when it is needed. Consequently, more clients are satisfied and the overall utilization of the network is improved. Existing solutions for handling congestion fall short since they either result in inefficient utilization of resources and poor performance, or require changes to the client software, which is hard to realize in practice. Cell breathing, achieves load balancing by dynamically reconfiguring cell boundaries. It does not require changes to the client software or the standard, thereby making it rapidly deployable. Cell breathing is implemented by adjusting the power at each AP in the network. It is shown that power control algorithms work for both homogeneous and heterogeneous client demands. In addition, the dynamic version of the algorithm can adapt to changes in client demands by maximizing the total satisfied demand while limiting the number of clients that switch APs.

Cell breathing significantly out-performs the popular fixed power schemes and performs comparably to the sophisticated load balancing techniques where the client and the APs are required to cooperate with one another. Under high load, cell breathing allows the throughput to improve by up to 50% or more for uniform distributions of client locations and by up to an order of magnitude for non-uniform client distributions.

In view of the exemplary systems shown and described above, methodologies that may be implemented in accordance with the embodiments will be better appreciated with reference to the flow charts of FIGS. 4-10. While, for purposes of simplicity of explanation, the methodologies are shown and described as a series of blocks, it is to be understood and appreciated that the embodiments are not limited by the order of the blocks, as some blocks may, in accordance with an embodiment, occur in different orders and/or concurrently with other blocks from that shown and described herein. Moreover, not all illustrated blocks may be required to implement the methodologies in accordance with the embodiments.

The embodiments may be described in the general context of computer-executable instructions, such as program modules, executed by one or more components. Generally, program modules include routines, programs, objects, data structures, etc., that perform particular tasks or implement particular abstract data types. Typically, the functionality of the program modules may be combined or distributed as desired in various instances of the embodiments.

Figure 4:
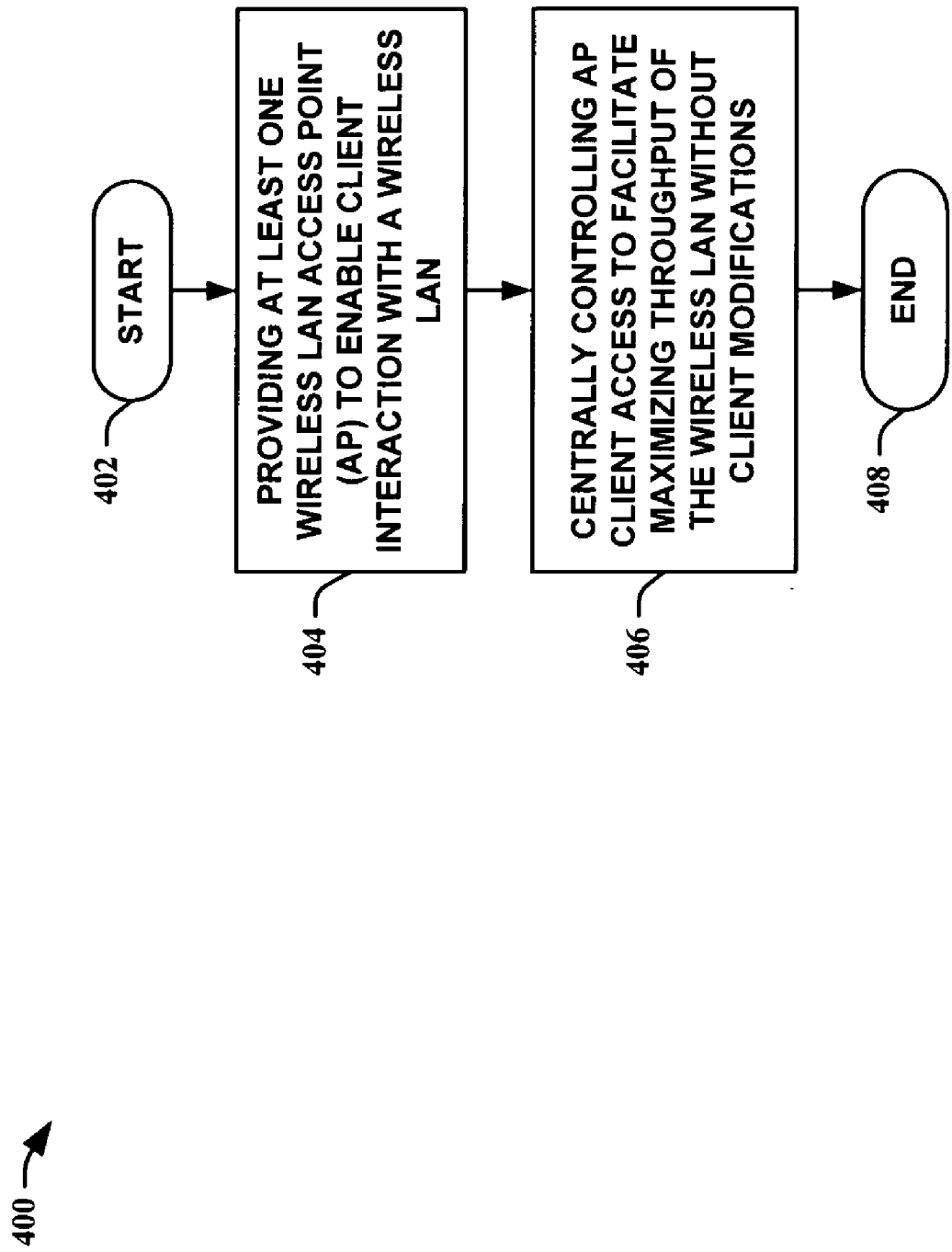
FIG. 4 is a flow diagram of a method of facilitating data throughput maximization for a wireless LAN in accordance with an aspect of an embodiment.

In FIG. 4, a flow diagram of a method 400 of facilitating data throughput maximization for a wireless LAN in accordance with an aspect of an embodiment is shown. The method 400 starts 402 by providing at least one wireless LAN access point (AP) to enable client interaction with a wireless LAN 404. AP client access is then centrally controlled to facilitate maximizing throughput of the wireless LAN without client modifications 406, ending the flow 408. Typically, the maximizing of the throughput is accomplished by dynamically adjusting beacon transmission power for at least one AP. The power levels are adjusted based on algorithms (describe herein) that account for received client power obtained by direct measurement, estimation, and/or in relation to transmitted power of an AP to received power of a client and the like.

Figure 5:
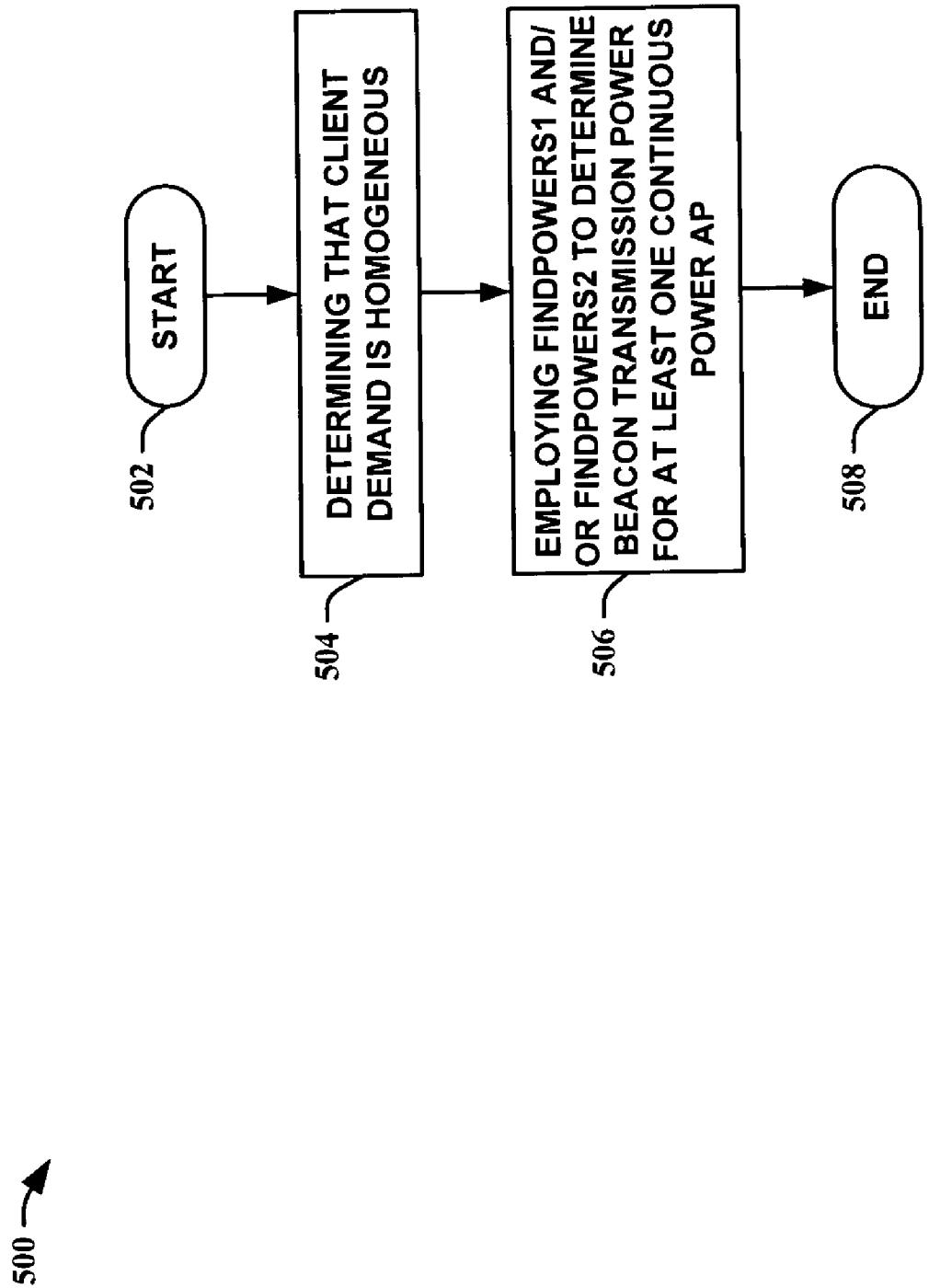
FIG. 5 is a flow diagram of a method of facilitating data throughput maximization for a wireless LAN with a continuous power AP and homogenous client demands in accordance with an aspect of an embodiment.

Looking at FIG. 5, a flow diagram of a method 500 of facilitating data throughput maximization for a wireless LAN with a continuous power AP and homogenous client demands in accordance with an aspect of an embodiment is depicted. The method 500 starts 502 by determining that client demand is homogeneous 504. Beacon transmission power for at least one continuous power AP is then determined by employing:

FindPowers1 Algorithm:
  solving linear program:

$$\text{maximize} \quad \sum_{i \in C} \lambda_i + \sum_{j \in A} C_j \pi_j \quad \text{(Eq. 5)}$$
$$\text{subject to} \quad \forall\, i \in C, j \in A \quad \lambda_i + \pi_j \leq w_{ij}$$
$$\forall\, j \in A \quad \pi_j \geq 0;$$

letting ($\{\lambda^*_i | i \in C\}, \{\pi^*_j | j \in A\}$) be an optimal solution for the linear program;
  setting $P_j = e^{\pi^*_j}$ for all APs j; and
  scaling all powers by the same factor such that $P_j \leq M_j$;

where $M_j$ is a minimum power at which AP j can reach all clients that it serves, A is a set of APs, C is a set of clients, and $w_{ij}$ is a weight of an edge from AP i to client j.

and/or:

FindPowers2 Algorithm:
  constructing a weighted bipartite graph G(A,C,E), where A is a set of APs, C is a set of clients, E is a set of edges between them, and a weight of an edge from AP i to client j is equal to $w_{ij} = \alpha \ln(d(i,j))$;
  finding a minimum weight bipartite matching in G, where a capacity of every client is 1, and a capacity of an AP i is $C_i$;
  building a directed graph $D(A \cup \{r\}, E)$ where for two APs j and k, set $l_{jk} = \min_{i \in C: x^*_{ij}=1}(w_{ij} - w_{ik})$ and for an edge jr from AP j to r, set $l_{jr} = m_j$;
  setting $p_j$ as a shortest path from AP j to r in graph D; and
  setting a power of AP j, $P_j = e^{-P_j}$ 506;

ending the flow 508. The FindPowers2 algorithm typically is more efficient than the FindPowers1 algorithm.

Figure 6:
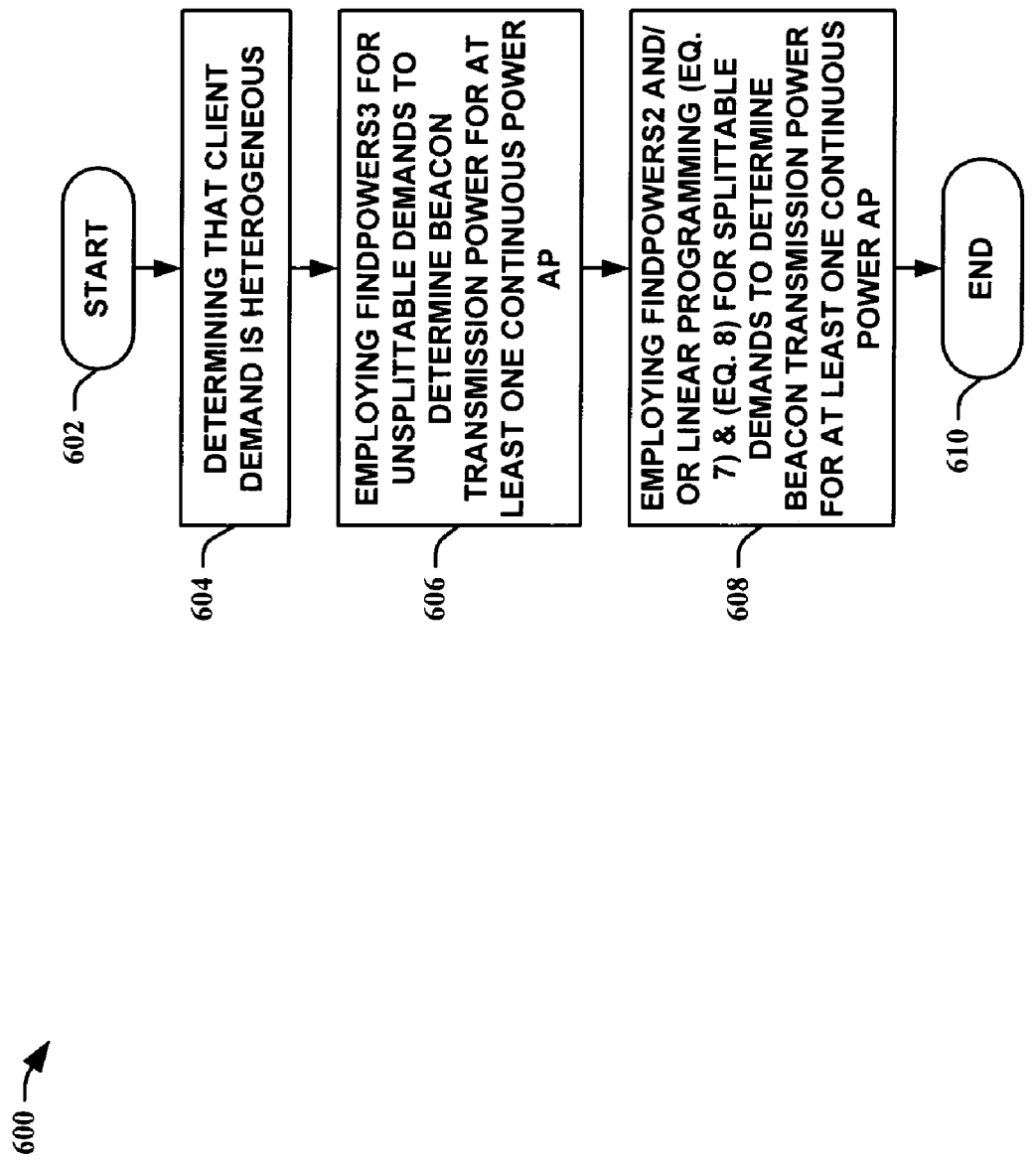
FIG. 6 is a flow diagram of a method of facilitating data throughput maximization for a wireless LAN with a continuous power AP and heterogeneous client demands in accordance with an aspect of an embodiment.

Turning to FIG. 6, a flow diagram of a method 600 of facilitating data throughput maximization for a wireless LAN with a continuous power AP and heterogeneous client demands in accordance with an aspect of an embodiment is illustrated. The method 600 starts 602 by determining that client demand is heterogeneous 604. Beacon transmission power for at least one continuous power AP is then determined for unsplittable demands by employing:

FindPowers3 Algorithm:
  finding an optimum extreme point solution $x^*_{ij}$ to:

$$\text{minimize} \quad \sum_{i \in C, j \in A} w_{ij} x_{ij} \quad \text{(Eq. 7)}$$
$$\text{subject to} \quad \forall\, i \in C \quad \sum_{j \in A} x_{ij} = 1$$
$$\forall\, j \in A \quad \sum_{i \in C} D_i x_{ij} \leq C_j$$
$$\forall\, i \in C, j \in A \quad x_{ij} \geq 0$$

and its corresponding dual optimum $\lambda^*_i$ and $\pi^*_j$ to:

$$\text{maximize} \quad \sum_{i \in C} \lambda_i + \sum_{j \in A} C_j \pi^*_j \quad \text{(Eq. 8)}$$
$$\text{subject to} \quad \forall\, i \in C, j \in A \quad D_i \lambda_i + \pi^*_j \leq w_{ij}$$
$$\forall\, i \in C \quad \lambda_i \geq 0;$$

setting $P_j := e^{\pi_j}$;
  connecting every client i to AP j for which $x^*_{ij} = 1$ if such j exists, otherwise do not serve i; and
  scaling all powers by the same factor such that $P_j \geq M_j$;

where $M_j$ is a minimum power at which AP j can reach all clients that it serves, A is a set of APs, C is a set of clients, $D_i$ denotes a demand from client i, and $w_{ij}$ is a weight of an edge from AP i to client j 606.

Beacon transmission power for at least one continuous power AP is then determined for splittable demands by splitting demands into small uniform demands and employing:

FindPowers2 Algorithm:
  constructing a weighted bipartite graph G(A,C,E), where A is a set of APs, C is a set of clients, E is a set of edges between them, and a weight of an edge from AP i to client j is equal to $w_{ij} = \alpha \ln(d(i,j))$;
  finding a minimum weight bipartite matching in G, where a capacity of every client is 1, and a capacity of an AP i is $C_i$;
  building a directed graph $D(A \cup \{r\}, E)$ where for two APs j and k, set $l_{jk} = \min_{i \in C: x^*_{ij}=1}(w_{ij} - w_{ik})$ and for an edge jr from AP j to r, set $l_{jr} = m_j$;
  setting $p_j$ as a shortest path from AP j to r in graph D; and
  setting a power of AP j, $P_j = e^{-P_j}$;

and/or by employing:

Linear Equations 7 & 8:
  finding an optimum extreme point fractional solution $x^*_{ij}$ to:

$$\text{minimize} \quad \sum_{i \in C, j \in A} w_{ij} x_{ij} \quad \text{(Eq. 7)}$$
$$\text{subject to} \quad \forall\, i \in C \quad \sum_{j \in A} x_{ij} = 1$$
$$\forall\, j \in A \quad \sum_{i \in C} D_i x_{ij} \leq C_j$$
$$\forall\, i \in C, j \in A \quad x_{ij} \geq 0$$

and its corresponding dual optimum $\lambda^*_i$ and $\pi^*_j$ to:

$$\text{maximize} \quad \sum_{i \in C} \lambda_i + \sum_{j \in A} C_j \pi^*_j \qquad (Eq.\ 8)$$

$$\text{subject to} \quad \forall\ i \in C, j \in A \quad D_i \lambda_i + \pi^*_j \leq w_{ij}$$

$$\forall\ i \in C \quad \lambda_i \geq 0;$$

where A is a set of APs, C is a set of clients, $D_i$ denotes a demand from client i, and $w_{ij}$ is a weight of an edge from AP i to client j 608, ending the flow 610.

Figure 7:
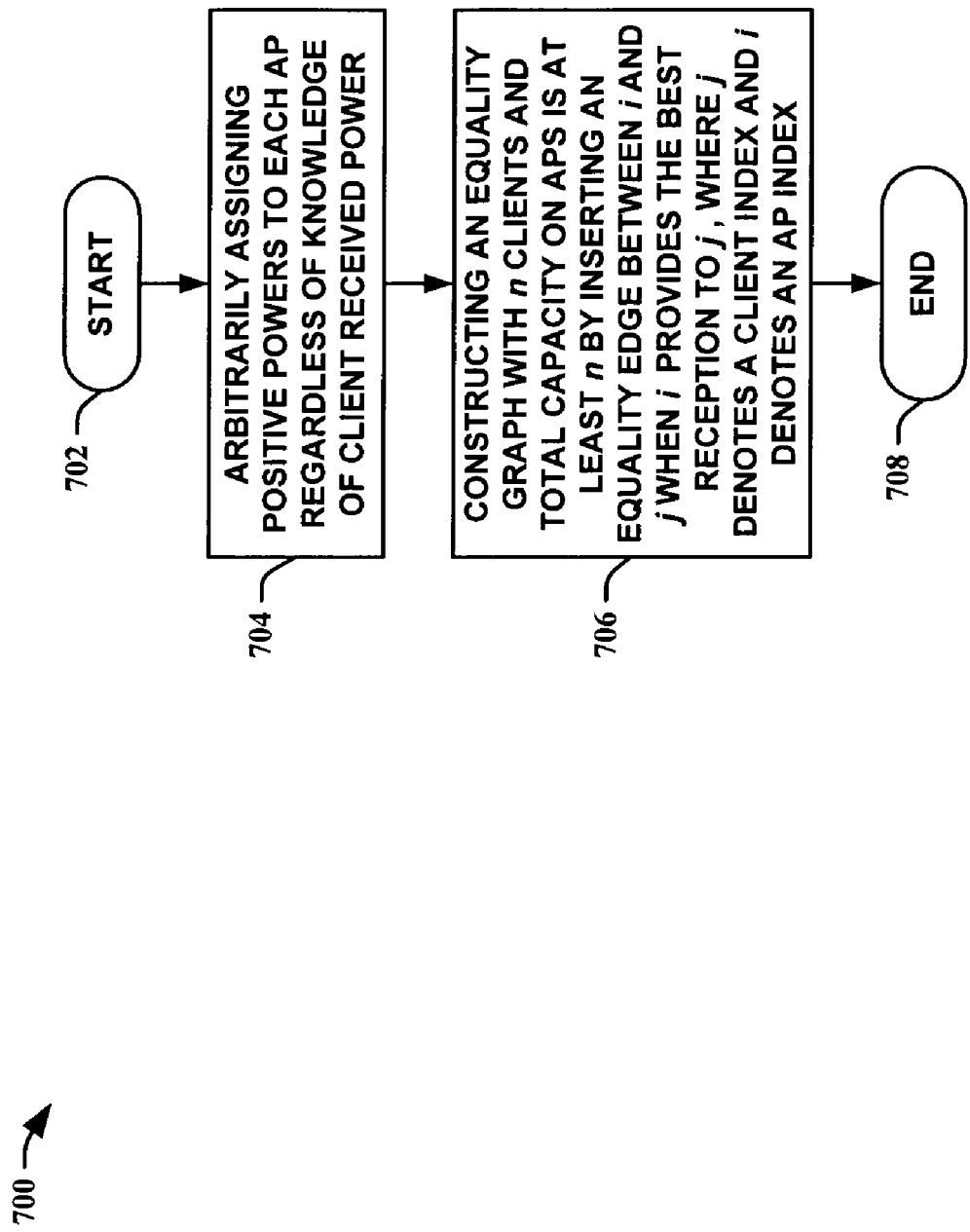
FIG. 7 is a flow diagram of a method of facilitating data throughput maximization for a wireless LAN with a continuous power AP and without client received power in accordance with an aspect of an embodiment.

Referring to FIG. 7, a flow diagram of a method 700 of facilitating data throughput maximization for a wireless LAN with a continuous power AP and without client received power in accordance with an aspect of an embodiment is shown. The method 700 starts 702 by arbitrarily assigning positive powers to each AP regardless of knowledge of client received power 704. An equality graph is then constructed with n clients and total capacity on APs is at least n by inserting an equality edge between i and j when i provides the best reception to j, where j denotes a client index and i denotes an AP index 706, ending the flow 708.

Figure 8:
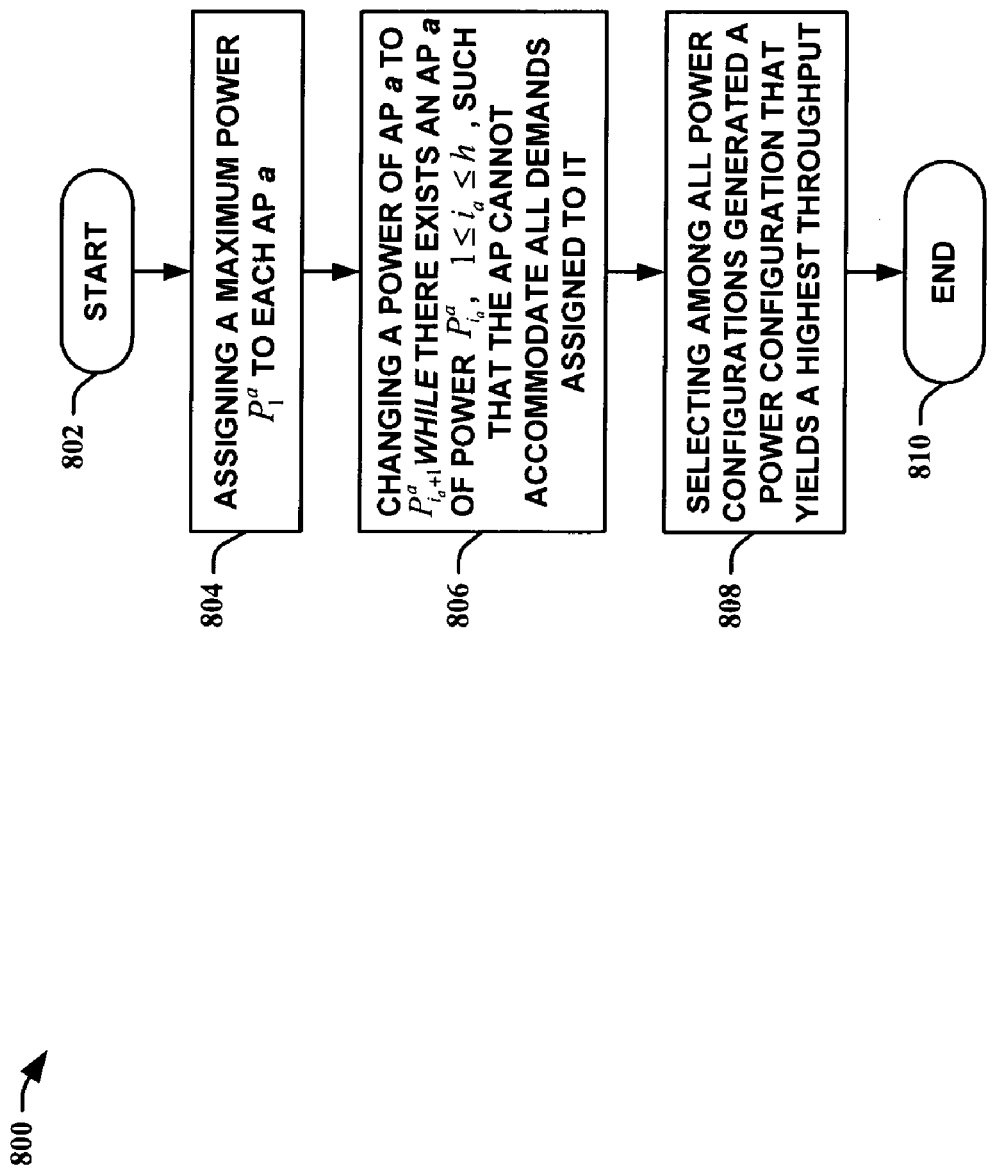
FIG. 8 is a flow diagram of a method of facilitating data throughput maximization for a wireless LAN with a discrete power AP in accordance with an aspect of an embodiment.

Moving on to FIG. 8, a flow diagram of a method 800 of facilitating data throughput maximization for a wireless LAN with a discrete power AP in accordance with an aspect of an embodiment is depicted. The method 800 starts 802 by assigning a maximum power $P_1^a$ to each AP a 804. A power of AP a is changed to $P_{i_a+1}^a$ while there exists an AP a of power $P_{i_a}^a$, $1 \leq i_a \leq h$, such that the AP cannot accommodate all demands assigned to it 806. A power configuration that yields a highest throughput is then selected from among all power configurations generated 808, ending the flow 810.

Figure 9:
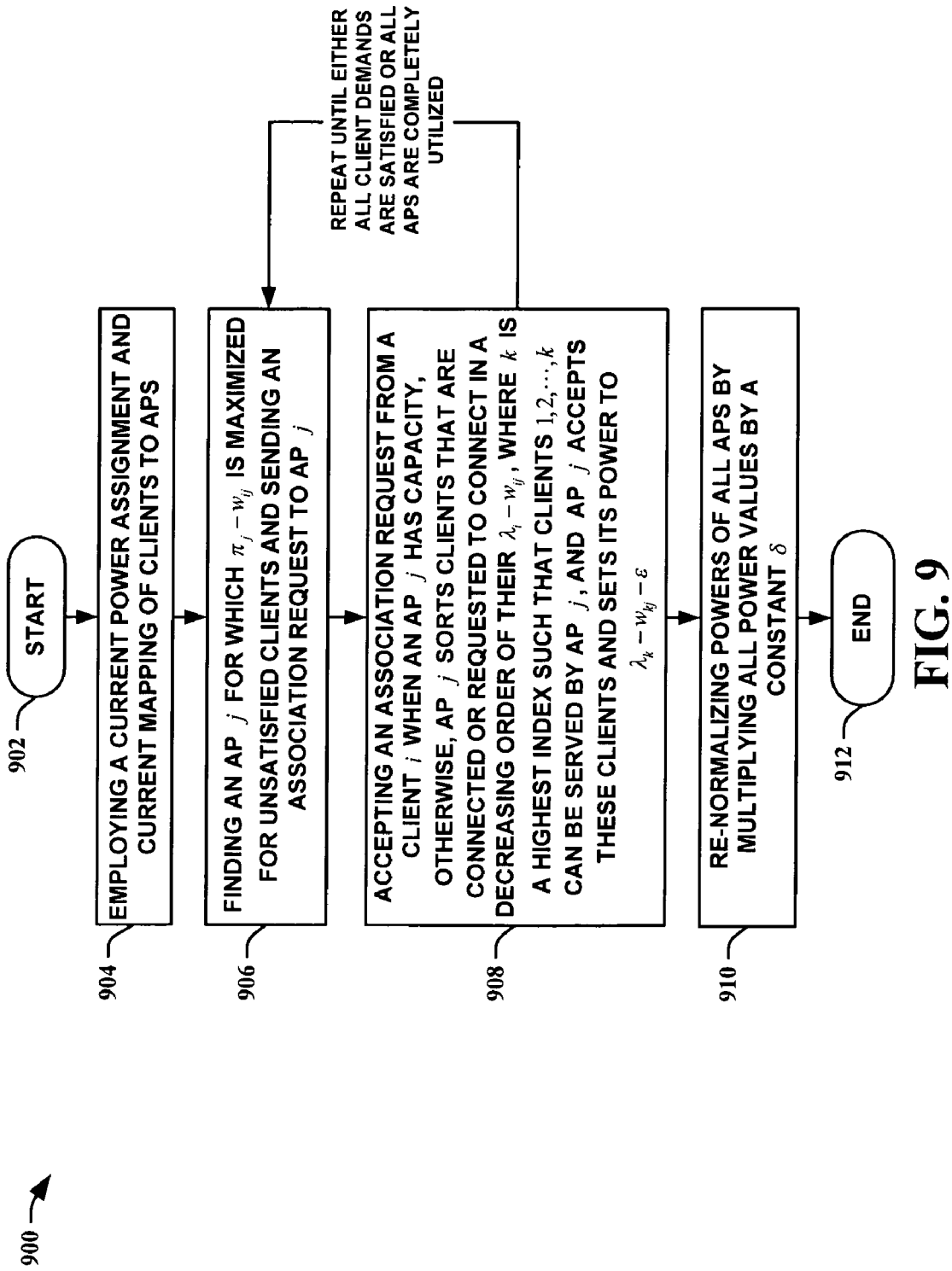
FIG. 9 is a flow diagram of a method of facilitating data throughput maximization for a wireless LAN with dynamic client demands in accordance with an aspect of an embodiment.

In FIG. 9, a flow diagram of a method 900 of facilitating data throughput maximization for a wireless LAN with dynamic client demands in accordance with an aspect of an embodiment is illustrated. The method 900 starts 902 by employing a current power assignment and current mapping of clients to APs 904. The following is then repeated until either all client demands are satisfied or all APs are completely utilized:

finding an AP j for which $\pi_j - w_{ij}$ is maximized for unsatisfied clients and sending an association request to AP j 906;

accepting an association request from a client i when an AP j has capacity, otherwise, AP j sorts clients that are connected or requested to connect in a decreasing order of their $\lambda_i - w_{ij}$, where k is a highest index such that clients 1, 2, ..., k can be served by AP j, and AP j accepts these clients and sets its power to $\lambda_k - w_{kj} - \epsilon$ 908.

The powers of all APs are then re-normalized by multiplying all power values by a constant $\delta$ 910, ending the flow 912.

Figure 10:
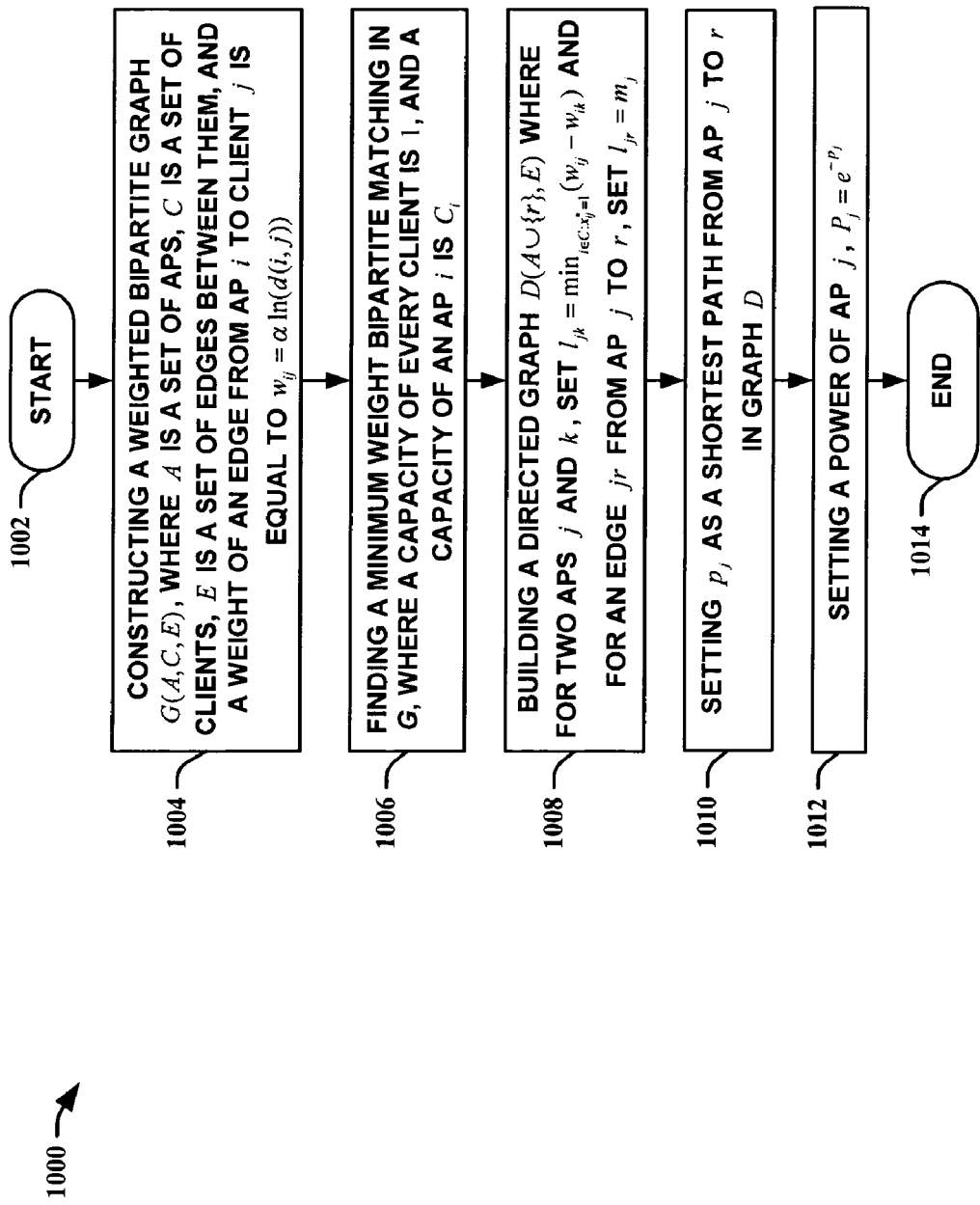
FIG. 10 is a flow diagram of a method of facilitating power optimization for a wireless LAN in accordance with an aspect of an embodiment.

Looking at FIG. 10, a flow diagram of a method 1000 of facilitating power optimization for a wireless LAN in accordance with an aspect of an embodiment is shown. The method 1000 starts 1002 by constructing a weighted bipartite graph G(A,C,E), where A is a set of APs, C is a set of clients, E is a set of edges between them, and a weight of an edge from AP i to client j is equal to $w_{ij} = \alpha \ln(d(i,j))$ 1004. A minimum weight bipartite matching in G is then found, where a capacity of every client is 1 and a capacity of an AP i is $C_i$ 1006. A directed graph $D(A \cup \{r\}, E)$ is then built where for two APs j and k, set $l_{jk} = \min_{i \in C: x^*_{ij} = 1}(w_{ij} - w_{ik})$ and for an edge jr from AP j to r, set $l_{jr} = m_j$ 1008. $p_j$ is then set as a shortest path from AP j to r in graph D 1010. A power of AP j is then set to $P_j = e^{-P_j}$ 1012, ending the flow 1014.

It is to be appreciated that the systems and/or methods of the embodiments can be utilized in wireless LAN throughput facilitating computer components and non-computer related components alike. Further, those skilled in the art will recognize that the systems and/or methods of the embodiments are employable in a vast array of electronic related technologies, including, but not limited to, computers, servers and/or handheld electronic devices, and the like.

What has been described above includes examples of the embodiments. It is, of course, not possible to describe every conceivable combination of components or methodologies for purposes of describing the embodiments, but one of ordinary skill in the art may recognize that many further combinations and permutations of the embodiments are possible. Accordingly, the subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system that facilitates data throughput for a wireless LAN, comprising:

at least one wireless LAN access point (AP) that provides wireless LAN access to a client; and a centralized control component that dynamically controls AP client access to facilitate maximizing throughput of the wireless LAN without client modifications and further dynamically adjusts beacon transmission power for at least one AP to facilitate maximizing throughput of the wireless LAN, wherein for homogeneous client demands for at least one AP with continuous power, determining beacon transmission power by a method selected from the group consisting of:

a) constructing a weighted bipartite graph G(A,C,E), where A is a set of APs, C is a set of clients, E is a set of edges between them, and a weight of an edge from AP i to client j is equal to $w_{ij} = \alpha \ln(d(i,j))$;

finding a minimum weight bipartite matching in G, where a capacity of every client is 1, and a capacity of an AP i is $C_i$;

building a directed graph $D(A \cup \{r\}, E)$ where for two APs j and k, set $l_{jk} = \min_{i \in C: x^*_{ij} = 1}(w_{ij} - w_{ik})$ and for an edge jr from AP j to r, set $l_{jr} = m_j$;

setting $p_j$ as a shortest path from AP j to r in graph D;

setting a power of AP j, $P_j = e^{p_j}$; and b) solving linear program:

maximize $$\sum_{i \in C} \lambda_i + \sum_{j \in A} C_j \pi_j \qquad (Eq.\ 5)$$

subject to $\forall i \in C, j \in A\ \lambda_i + \pi_j \leq w_{ij}\ \forall j \in A\ \pi_j \geq 0$;

letting $(\{\lambda^*_i | i \in C\}, \{\pi^*_j | j \in A\})$ be an optimal solution for the linear program;

setting $P_j = e^{\pi^*_j}$ for all APs j;

scaling all powers by the same factor such that $P_j \geq M_j$;

where $M_j$ is a minimum power at which AP j can reach all clients that it serves, A is a set of APs, C is a set of clients, and $w_{ij}$ is a weight of an edge from AP i to client j.

2. The system of claim 1, the centralized control component determines beacon transmission power for the at least one AP based on, at least in part, that received client power is proportional to AP transmission power.

3. The system of claim 1, the centralized control component employs discrete power AP techniques that optimize wireless LAN throughput for client demands.

4. The system of claim 1, the centralized control component utilizes measured and/or estimated client received power to maximize throughput of the wireless LAN.

5. The system of claim 1, the centralized control component maximizes throughput of the wireless LAN for dynamic client loads.

6. A method for mitigating data congestion of a wireless LAN, comprising:
  interacting with at least one wireless LAN access point (AP) to provide wireless LAN access to at least one client;
  manipulating client access to the wireless LAN APs from a centralized location to mitigate congestion and maximize throughput of the wireless LAN as a whole, the manipulation accomplished utilizing existing AP-client interface protocols;
  dynamically adjusting beacon transmission power for at least one AP to facilitate maximizing throughput of the wireless LAN;
  determining beacon transmission power for splittable heterogeneous client demands for at least one AP with continuous power by a method selected from the group consisting of:
    a) splitting demands into small uniform demands;
      constructing a weighted bipartite graph G(A,C,E), where A is a set of APs, C is a set of clients, is a set of edges between them, and a weight of an edge from AP i to client j is equal to $w_{ij}=\alpha \ln(d(i,j))$;
      finding a minimum weight bipartite matching in G, where a capacity of every client is 1, and a capacity of an AP i is $C_i$;
      building a directed graph $D(A\cup\{r\},E)$ where for two APs j and k, set $l_{jk}=\min_{i\in C: x^*_{ij}=1}(w_{ij}-w_{ik})$ and for an edge jr from AP j to r, set $l_{jr}=m_j$;
      setting $p_j$ as a shortest path from AP j to r in graph D;
      setting a power of AP j, $P_j=e^{p_j}$; and
    b) finding an optimum extreme point fractional solution $x^*_{ij}$ to:
      minimize $$\sum_{i\in C, j\in A} w_{ij} x_{ij} \quad (\text{Eq. 7})$$

subject to $\forall i \in C$ $$\sum_{j\in A} x_{ij} = 1$$

$\forall j \in A$ $$\sum_{i\in C} D_i x_{ij} \le C_j$$

$\forall i \in C, j \in A\ x_{ij} \ge 0$
and its corresponding dual optimum $\lambda^*_i$ and $\pi^*_j$ to:
maximize $$\sum_{i\in C}\lambda_i + \sum_{j\in A} C_j \pi^*_j \quad (\text{Eq. 8})$$

subject to $\forall i\in C, j\in A\ D_i\lambda_i\pi^*_j \le w_{ij}\ \forall i\in C\ \lambda_i \ge 0$;
where A is a set of APs, C is a set of clients, $D_i$ denotes a demand from client i, and $w_{ij}$ is a weight of an edge from AP i to client j.

7. A method for mitigating data congestion of a wireless LAN, comprising:
  interacting with at least one wireless LAN access point (AP) to provide wireless LAN access to at least one client;
  manipulating client access to the wireless LAN APs from a centralized location to mitigate congestion and maximize throughput of the wireless LAN as a whole, the manipulation accomplished utilizing existing AP-client interface protocols;
  dynamically adjusting beacon transmission power for at least one AP to facilitate maximizing throughput of the wireless LAN; and
  determining beacon transmission power for at least one AP with continuous power by:
    arbitrarily assigning positive powers to each AP; and
    constructing an equality graph with n clients and total capacity on APs is at least n by inserting an equality edge between i and j when i provides the best reception to j, where j denotes a client index and i denotes an AP index.

8. A method for mitigating data congestion of a wireless LAN, comprising:
  interacting with at least one wireless LAN access point (AP) to provide wireless LAN access to at least one client;
  manipulating client access to the wireless LAN APs from a centralized location to mitigate congestion and maximize throughput of the wireless LAN as a whole, the manipulation accomplished utilizing existing AP-client interface protocols;
  dynamically adjusting beacon transmission power for at least one AP to facilitate maximizing throughput of the wireless LAN; and
  determining beacon transmission power for at least one AP with discrete power by:
    assigning a maximum power $P_1^a$ to each AP a;
    changing a power of AP a to $P_{i_a+1}^a$ while there exists an AP a of power $P_{i_a}^a$, $1\le i_a \le h$, such that the AP cannot accommodate all demands assigned to it; and
    selecting among all power configurations generated a power configuration that yields a highest throughput.

9. A method for mitigating data congestion of a wireless LAN, comprising:
  interacting with at least one wireless LAN access point (AP) to provide wireless LAN access to at least one client;
  manipulating client access to the wireless LAN APs from a centralized location to mitigate congestion and maximize throughput of the wireless LAN as a whole, the manipulation accomplished utilizing existing AP-client interface protocols;
  dynamically adjusting beacon transmission power for at least one AP to facilitate maximizing throughput of the wireless LAN; and
  determining beacon transmission power for at least one AP with changing client demands by:

employing a current power assignment and current mapping of clients to APs;

repeating the following procedure until either all client demands are satisfied or all APs are completely utilized:

finding an AP j for which $\pi_j - w_{ij}$ is maximized for unsatisfied clients and sending an association request to AP j;

accepting an association request from a client i when an AP j has capacity, otherwise, AP j sorts clients that are connected or requested to connect in a decreasing order of their $\lambda_i - w_{ij}$, where k is a highest index such that clients 1, 2, ..., k can be served by AP j, and AP j accepts these clients and sets its power to $\lambda_k - w_{kj} - \epsilon$; and re-normalizing powers of all APs by multiplying all power values by a constant $\delta$.

10. A method for mitigating data congestion of a wireless LAN, comprising:

interacting with at least one wireless LAN access point (AP) to provide wireless LAN access to at least one client;

manipulating client access to the wireless LAN APs from a centralized location to mitigate congestion and maximize throughput of the wireless LAN as a whole, the manipulation accomplished utilizing existing AP-client interface protocols; and dynamically adjusting beacon transmission power for at least one AP to facilitate in optimizing power of the wireless LAN by:

constructing a weighted bipartite graph G(A,C,E), where A is a set of APs, C is a set of clients, E is a set of edges between them, and a weight of an edge from AP i to client j is equal to $w_{ij} = \alpha \ln(d(i,j))$;

finding a minimum weight bipartite matching in G, where a capacity of every client is 1, and a capacity of an AP i is $C_i$;

building a directed graph $D(A \forall \{r\}, E)$ where for two APs j and k, set $l_{jk} = \min_{i \in C: x^*_{ij}=1}(w_{ij} - w_{ik})$ and for an edge jr from AP j to r, set $l_{jr} = m_j$;

setting $p_j$ as a shortest path from AP j to r in graph D; and setting a power of AP j, $P_j = e^{-p_j}$.

11. A system that facilitates data throughput for a wireless LAN, comprising:

means for interacting with at least one wireless LAN access point (AP) to allow wireless interfacing with at least one client;

means for mitigating congestion of the wireless LAN utilizing existing AP-client protocols and a centralized AP access control to automatically adjust AP power levels to maximize throughput of the wireless LAN;

means for dynamically adjusting beacon transmission power for at least one AP to facilitate maximizing throughput of the wireless LAN; and means for determining beacon transmission power for unsplittable heterogeneous client demands for at least one AP with continuous power by:

finding an optimum extreme point solution to:

minimize $$\sum_{i \in C, j \in A} w_{ij} x_{ij} \qquad (Eq.\ 7)$$

subject to $\forall i \in C$ $$\sum_{j \in A} x_{ij} = 1$$

$\forall j \in A$ $$\sum_{i \in C} D_i x_{ij} \leq C_j$$

$\forall i \in C, j \in A \ x_{ij} \geq 0$ and its corresponding dual optimum $\lambda^*_i$ and $\pi^*_j$ to:

maximize $$\sum_{i \in C} \lambda_i + \sum_{j \in A} C_j \pi^*_j \qquad (Eq.\ 8)$$

subject to $\forall i \in C, j \in A \ D_i \lambda_i \pi^*_j \leq w_{ij} \ \forall i \in C \ \lambda_i \geq 0$;

setting $P_j := e^{\pi_j}$;

connecting every client i to AP j for which $x^*_{ij} = 1$ if such j exists, otherwise do not serve i; and scaling all powers by the same factor such that $P_j \geq M_j$;

where $M_j$ is a minimum power at which AP j can reach all clients that it serves, A is a set of APs, C is a set of clients, $D_i$ denotes a demand from client i, and $w_{ij}$ is a weight of an edge from AP i to client j.

* * * * *

UNITED STATES PATENT AND TRADEMARK OFFICE
CERTIFICATE OF CORRECTION

PATENT NO. : 7,715,353 B2
APPLICATION NO. : 11/409132
DATED : May 11, 2010
INVENTOR(S) : Kamal Jain et al.

It is certified that error appears in the above-identified patent and that said Letters Patent is hereby corrected as shown below:

In column 24, line 48, in Claim 1, delete "$P_j - e^{p_r}$" and insert -- $P_j = e^{-P_r}$ --, therefor.

In column 25, line 31, in Claim 6, delete ", is" and insert --, E is --, therefor.

In column 25, line 41, in Claim 6, delete "$P_j \ e^{p_r}$" and insert -- $P_j = e^{-P_r}$ --, therefor.

In column 27, line 38, in Claim 10, delete "$D(A \forall \{r\}, E)$" and insert -- $D(A \cup \{r\}, E)$ --, therefor.

In column 28, line 9, in Claim 11, before "to:" insert -- $x_{ij}^*$ --.

Signed and Sealed this
Fifteenth Day of February, 2011

David J. Kappos
*Director of the United States Patent and Trademark Office*